United States Patent

[15] 3,640,616

Egnaczak et al.

[45] Feb. 8, 1972

[54] OPAQUE ILLUMINATION AND SCANNING SYSTEM

[72] Inventors: Raymond K. Egnaczak, Williamson; Gino F. Squassoni, Pittsford, both of N.Y.

[73] Assignee: Xerox Corporation, Rochester, N.Y.

[22] Filed: Nov. 14, 1969

[21] Appl. No.: 876,713

[52] U.S. Cl. ..................................355/8, 355/51, 355/66, 355/70
[51] Int. Cl. .......................................G03g 15/00
[58] Field of Search..................................355/3, 8, 51, 66, 70

[56] References Cited

UNITED STATES PATENTS

| | | | |
|---|---|---|---|
| 3,419,327 | 12/1968 | Oikawa et al. | 355/8 |
| 3,528,738 | 9/1970 | Hodges | 355/8 X |

Primary Examiner—Samuel S. Matthews
Assistant Examiner—Richard A. Wintercorn
Attorney—James J. Ralabate, David C. Petre and Michael H. Shanahan

[57] ABSTRACT

An optical system is used to scan an opaque original in a line-by-line manner. The original is carried on the top deck of a carriage that travels past a stationary optical assembly. The carriage also has a bottom deck substantially parallel to and spaced from the top deck. The optical assembly fits between the two decks as the carriage travels thereby. Lamps within the optical assembly illuminate a generally linear area of the original and a light image of the original is projected through the optical assembly to the bottom deck of the carriage by a lens and three mirrors. One mirror is positioned at the nodal point of the lens to pass rays through the same lens twice. The light image projected to the bottom deck is used to expose a photoelectrophoretic ink for the formation of an image from the ink.

14 Claims, 34 Drawing Figures

INVENTORS
RAYMOND K. EGNACZAK
GINO F. SQUASSONI

OPAQUE ILLUMINATION AND SCANNING SYSTEM

BACKGROUND OF THE INVENTION

This invention relates to optical systems and specifically to optical scanning apparatus for illuminating an area of an opaque object or original and for projecting an image of the original to a target. More particularly, this invention relates to methods and apparatus for exposing a photoelectrophoretic ink to electromagnetic radiation in imagewise configuration to form an image from the ink.

In the photoelectrophoretic imaging process, an image is formed from an imaging suspension or ink by subjecting the ink to an electric field and exposing it to activating electromagnetic radiation, i.e., light. The imaging suspension is comprised of light-sensitive particles suspended within an insulating liquid carrier. The particles are believed to bear a net electrical charge while in suspension. Normally, the ink is placed between injecting and blocking electrodes used to establish the electric field and is exposed to a light image through one of the electrodes which is at least partially transparent. According to one theory, particles attracted to the injecting electrode by the electric field exchange charge with the injecting electrode when exposed to light and migrate under the influence of the field through the liquid carrier to the blocking electrode. As a result of the migration, positive and negative images are formed on the two electrodes. The blocking electrode is covered with a dielectric material to prevent charge exchange with the particles and thereby prevent the particles from oscillating back and forth between the two electrodes.

The photoelectrophoretic imaging process is either monochromatic or polychromatic depending upon whether the light-sensitive particles within the liquid carrier are responsive to the same or different portions of the light spectrum. A full color polychromatic system is obtained, for example, by using cyan, magenta and yellow colored particles which are responsive to red, green and blue light respectively. An extensive and detailed description of the photoelectrophoretic process is found in U.S. Pat. Nos. 3,384,565 and 3,384,488 to Tulagin and Carreira, U.S. Pat. No. 3,383,993 to Yeh and U.S. Pat. No. 3,384,566 to Clark.

The photoelectrophoretic imaging system disclosed in the above-identified patents utilizes a transparent flat plate configuration for one of the electrodes used in establishing the electric field across the imaging suspension. However, these patents do not discuss an imaging system adapted for the rapid production of images in a sequential manner as is desirable for a commercial application of the photoelectrophoretic process.

The present imaging system employs a transparent flat plate or shuttle electrode that travels past cleaning, imaging, developing and transfer stations located along the shuttle electrode path between park and turn positions. As the shuttle electrode travels from the park to the turn positions, the cleaning station prepares the surface of the shuttle electrode for the formation of an image. Ink is applied between the shuttle and a roller electrode at the imaging station and the ink is exposed to a light image and subjected to an electric field. The light image is projected to the imaging station from either a transparent or opaque original sought to be reproduced. The electric field is established by voltages coupled to the two electrodes. The desired image is formed on the shuttle electrode as it travels past the imaging station and this image is exposed to the light image and subjected to a field a second time at the development station. The additional exposure to light and application of field improves the quality of the earlier formed image. As the shuttle electrode travels from the turn to the park positions, the image is once again exposed to light and subjected to a field at the development station to improve the quality of the image. The imaging station is moved away from the path of the shuttle electrode and a transfer station is moved into a position adjacent the path. The image on the shuttle electrode is therefore transferred to a web as the electrode travels past the transfer station. The shuttle electrode moves past the cleaning station a second time on its return to the park position thereby preparing its surface for a subsequent image-forming cycle.

Accordingly, it is an object of the present invention to improve photoelectrophoretic imaging systems. Specifically, it is an object of the invention to devise means to illuminate a portion of an opaque original and expose photoelectrophoretic ink to a light image projected to the ink from the illuminated area.

As pointed out above it is sometimes desirable in photoelectrophoretic imaging systems to expose the ink to a light image more than one time. This means that the light image projected to the ink the second or any subsequent time must be in registration with, i.e., overlay in a predetermined manner, the light image initially projected to the ink. Accordingly, it is also an object of this invention to devise means for projecting a plurality of images to a target in registration to one another.

The registration of the light images is accomplished at least in part by moving the target, i.e., the shuttle electrode or plate, with the platen on which the original is carried. In addition, two separate optical assemblies are used to project an image on the platen to the same location on the shuttle plate. It is therefore another object of the invention to devise improved scanning apparatus capable of projecting images over optical paths resulting in image registration.

It is desirable to make the distance between the platen and shuttle plate as small as possible at least for the purpose of minimizing the outside dimensions of the scanning apparatus. A further object of this invention is therefore to devise means to fold, i.e., deflect, the light image into a plane generally parallel to the platen and shuttle plate to provide for a relatively long optical path and at the same time permit the platen to be positioned relatively close to the shuttle plate.

Yet another object of the present invention is to devise a three mirror projection system wherein a single lens is used twice in the optical path by positioning one of the mirrors at the nodal point of the lens.

Even a further object of this invention is to devise means for cooling high intensity lamps used to illuminate the opaque original carried on the platen.

DESCRIPTION OF THE DRAWINGS

Other objects and features of the present invention are apparent from a further reading of the specification and claims viewed in light of the drawings which are:

DESCRIPTION OF THE INVENTION

Figure 1:
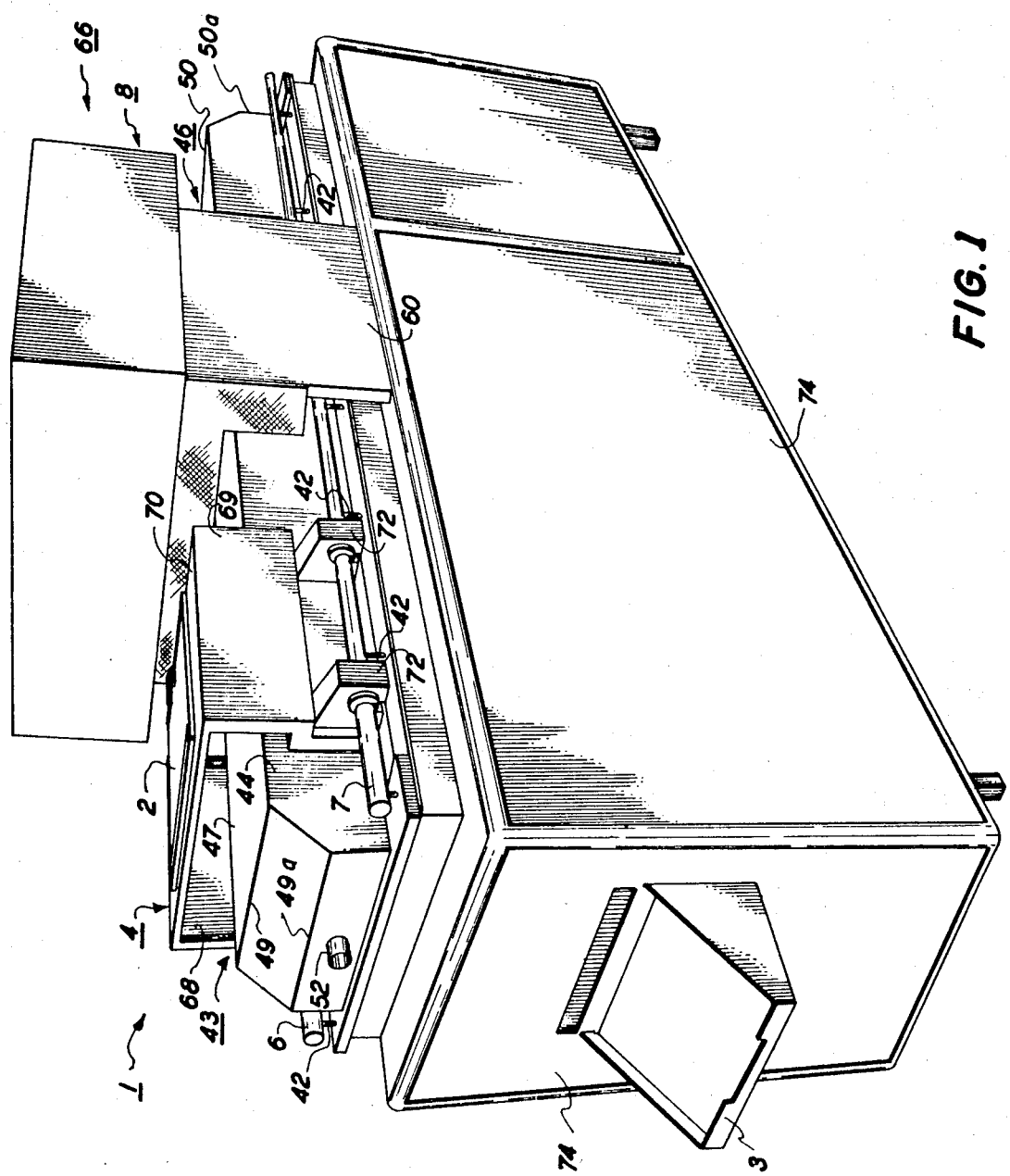
FIG. 1 is a perspective view of a photoelectrophoretic imaging machine according to the present invention.

The photoelectrophoretic machine 1 shown in FIG. 1 produces copies of opaque originals placed face down under the flap 2. The copies produced by the machine are collected in the output tray 3 and comprise either monochromatic or polychromatic photoelectrophoretic ink particles carried on an opaque paper substrate. Machine 1 is modified to produce copies of transparent originals by substituting the optical input apparatus shown in FIG. 15 for the optical apparatus illustrated in FIG. 2. Transparent copies can be produced by merely substituting a transparent substrate for the opaque paper substrate. In any event, the apparatus, method and operation of the photoelectrophoretic machine 1 is substantially the same whether opaque or transparent originals and/or copies are involved. Consequently, the photoelectrophoretic imaging system of the present invention is described in its entirety as a machine for making opaque copies of opaque originals and the modification required for the machine to function with transparent originals is described separately.

Copies are made when the carriage assembly 4 moves from its park position as shown in FIG. 1 to a turn position at the opposite end of the rails 6 and 7 and thereafter returns to the start or park position. As the carriage travels through the optical enclosure 8, a light image of the original placed under flap 2 is projected downward through a transparent injecting electrode coupled to the carriage and into a stationary blocking electrode journaled for rotation to the frame of the machine. (For a detailed explanation of the terms blocking and injecting electrode and their roles in the photoelectrophoretic process, refer to the Tulagin et al., Clark and Yeh patents mentioned earlier.) A photoelectrophoretic ink comprising photosensitive particles suspended in an insulating carrier liquid is applied between the two electrodes and an image is formed from the photosensitive particles on the injecting electrode as the carriage travels toward the turn position. The image formed on the injecting electrode is transferred to a paper substrate during the return trip of the carriage from the turn to the park position.

Figure 2:
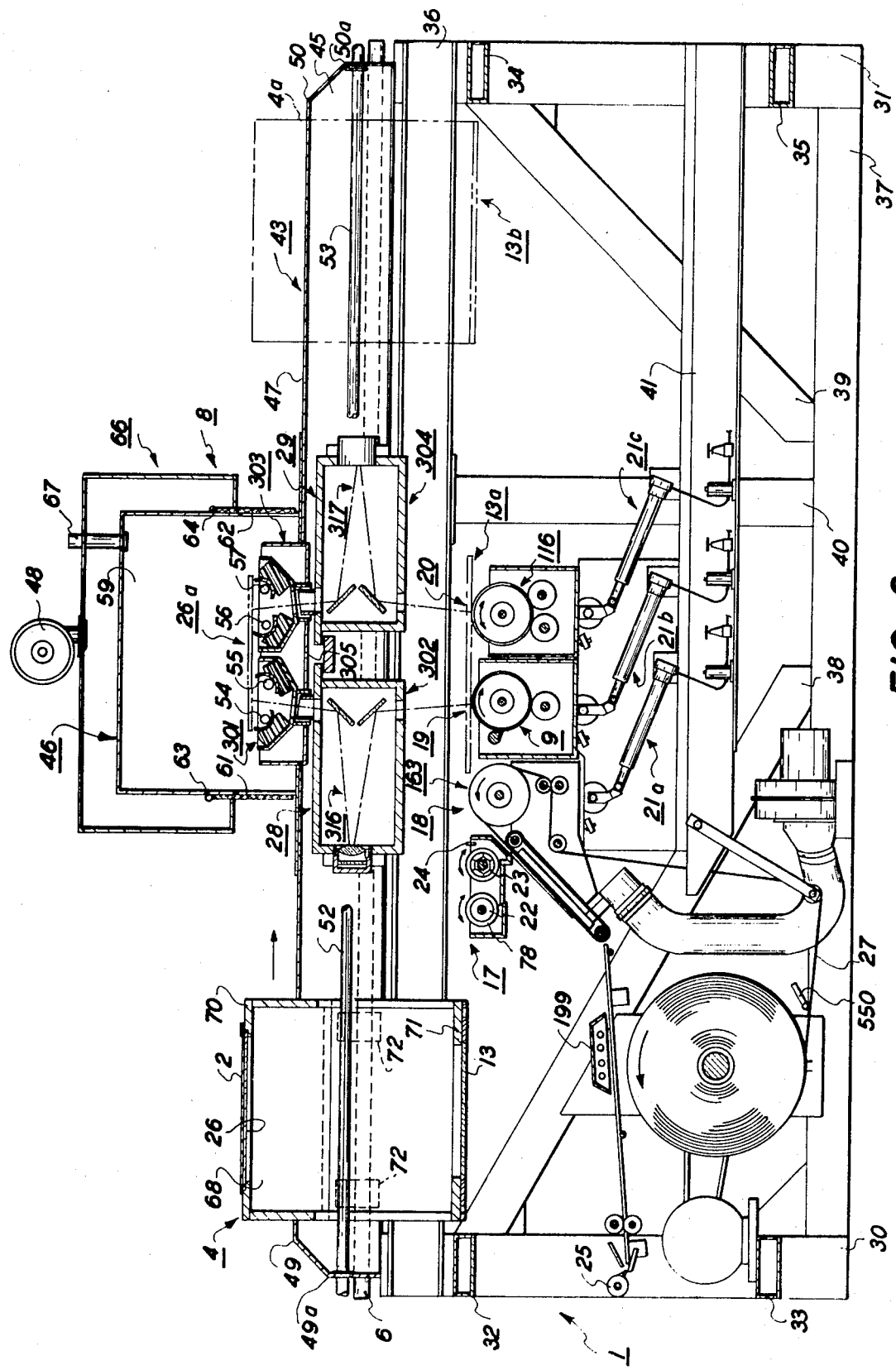
FIG. 2 is a side cross-sectional view of the machine of FIG. 1.

Both the injecting and blocking electrodes are properly termed imaging electrodes because images are formed from a photoelectrophoretic ink placed between them. In the present description, however, the term "imaging electrode" refers to the stationary or nontranslating electrode which in the present embodiments are blocking electrodes. The imaging electrode 9 shown in FIG. 2 is a cylindrical roller journaled for rotation having an electrically conductive rubber core 11 (FIG. 7) overcoated with a layer of electrically insulating material 12.

Similarly, either or both the injecting or blocking electrodes may be transparent to enable the photoelectrophoretic ink between the two electrodes to be exposed to a light image. In the present embodiment, however, the shuttle electrode, i.e., the electrode carried back and forth between the park and turn positions, is transparent. The moving or shuttle electrode 13 shown in FIG. 2 is functionally an injecting electrode and comprises an optically transparent glass 14 coated with a thin, optically transparent layer of tin oxide 15 (FIG. 7) which is commercially available under the name NESA glass.

In the present embodiments the shuttle electrode is structurally a flat plate and is mounted on the carriage 4 in order to move it past the cleaning assembly 17, transfer assembly 18, imaging assembly 19, and development assembly 20. The elevator mechanisms 21a, b, and c, are used to raise and lower the various assemblies 18-20 into and out of operative engagement with the shuttle electrode during the course of its travel. The dashed lines 13a indicate the position of the shuttle electrode relative to the various assemblies at substantially the midpoint position of the carriage between the park and turn positions. Dashed lines 4a and 13b indicate the location of the carriage and shuttle electrode at the turn position while, as mentioned earlier, the carriage position shown in FIG. 2 is the park position.

The surface of the shuttle electrode 13 is scrubbed by the cleaning rollers 22 and 23 and wiped by the squeegee 24 each time the carriage passes the cleaning assembly 17. A photoelectrophoretic ink is applied between the imaging roller 9 and the shuttle electrode 13 as the carriage travels past the imaging assembly 19. A light image of the original placed on platen 26 under flap 2 is projected to the ink between the roller 9 and plate 13 by optical assembly 28 causing an image to be formed on the plate or shuttle electrode 13. The ink on the shuttle electrode is exposed to a light image of the original a second and third time by optical assembly 29 when the carriage moves past the development assembly 20 traveling toward the turn position and when traveling back toward the park position. The image is transferred to the web 27 as the shuttle electrode moves past the transfer assembly 18 on the return trip toward the park position. The photoelectrophoretic ink transferred to the web is fixed to the web, the web is cut by the cutter bar 25 and the copy is delivered to the output tray 3. Meanwhile the carriage returns to the park position and the machine is ready for the production of another copy. The entire operation occurs within fractions of a minute thereby enabling multiple copies to be rapidly and efficiently produced.

THE MACHINE STRUCTURE

The various components and assemblies of the photoelectrophoretic machine 1 are carried by a frame comprising four corner box beams, of which beams 30 and 31 are shown in FIG. 2, the end horizontal box beams 32, 33, 34 and 35 and four side horizontal angle beams, of which beams 36 and 37 are shown in FIG. 2. Four tie box beams, of which beams 38 and 39 are shown in FIG. 2, and two vertical box beams, of which beam is shown in FIG. 2, are coupled to the frame to lend it structural stability.

The rails 6 and 7 are cylindrical rods rigidly supported on the frame by means including the struts or spacers 42 (FIG. 1). The rails extend parallel to one another substantially the entire length of the frame defining the generally linear path over which the carriage 4 and shuttle electrode 13 travel. The tunnel housing 43 is positioned between the rails 6 and 7 and is made from the sheet metal plates including two sideplates 44 and 45 and the top plate 47. The angled breaks 49, 49a, 50 and 50a are made in the top plate 47 to close the ends of the tunnel. Air is pumped by a fan into the optical assemblies 28 and 29 through the air hoses 52 and 53 positioned within the tunnel housing. The air helps cool the lamps 54–57 in the optical assemblies.

The optical enclosure 8 is both a light shield and an air baffle. It is made up of the hood 46 and the bonnet 66. The vertical sidewalls 59 and 60 of the hood (FIG. 1) are anchored to the machine frame on the outside of rails 6 and 7. Two fabric curtains 61 and 62 are draped from hangers 63 and 64 over doorways formed between the sidewalls of the hood. The curtains are cut generally to the outline of the tunnel housing 43 and form flexible doors that allow the carriage to pass through the optical enclosure. The curtains keep stray light from entering the optical assemblies 28 and 29, protect the operator from the intense radiation of the lamps 54–57 and retain cooling air in the enclosure as the carriage travels therethrough. The bonnet 66 is a four-walled structure having a top but no bottom which is fit over and supported above the hood 46. The air pumped via hoses 52 and 53 into the optical assemblies 28 and 29 passes between the lamps in each optical assembly and rises into the hood. This air is exhausted from the hood by a blower coupled to hose 67. Room or ambient air is circulated between the walls of the bonnet 66 and the walls of the hood by the blower 48 to help dissipate the heat energy of the air within the hood.

The carriage 4 includes a generally U-shaped metal casting having the sideboards 68 and 69 and the top deck 70. A bottom deck 71 is coupled across the open end of the U-shaped casting. Two arms 72 are coupled to each sideboard and the arms in turn have roller bearings 73 operatively engaged with the rails 6 and 7. Consequently, the carriage 4 is slidably supported for travel along the rails 6 and 7. The top deck of the carriage has the flexible flap 2 hinged thereon and overlying the optically transparent glass platen 26. The top deck is at an elevation above the tunnel housing 43 and the lamps 54–57 enabling the platen 26 to assume the position indicated by the dashed lines 26a. The bottom deck 71 supports the flat plate NESA glass 13, i.e., the shuttle electrode, substantially parallel to the platen 26. The shuttle electrode is positioned at an elevation permitting the various rollers in the cleaning, transfer, imaging and developing assemblies to contact the shuttle electrode as the carriage travels along the rails.

The assemblies 17–20 as well as the motor, gears and drive chains for propelling the carriage are all carried by the machine frame. (The electrical power supplies required by the machine and many other electrical components are supported in a separate cabinet). The exterior panels 74 (FIG. 1) are also carried by the machine frame. The panels are primarily for appearance and are attached to the frame by appropriate fasteners that hold them out and away from the frame.

THE CLEANING ASSEMBLY

The cleaning assembly 17 is mounted on the machine frame at an elevation below the shuttle electrode 13 and is both the first and last assembly or station encountered by the shuttle electrode during the image forming cycle of the machine. The function of the cleaning assembly is to remove residue ink and other unwanted objects from the surface of the shuttle electrode. In this regard, the surface of the shuttle electrode on which images are formed is facing downward thereby preventing gravity from leading to the contamination and/or other harm of the shuttle electrode. The assembly 17 includes the tank 76 which is a frame coupling the assembly to the machine frame. The tank contains a cleaning fluid such as the fluid normally used as the liquid carrier insulator in the photoelectrophoretic ink.

Figure 33:
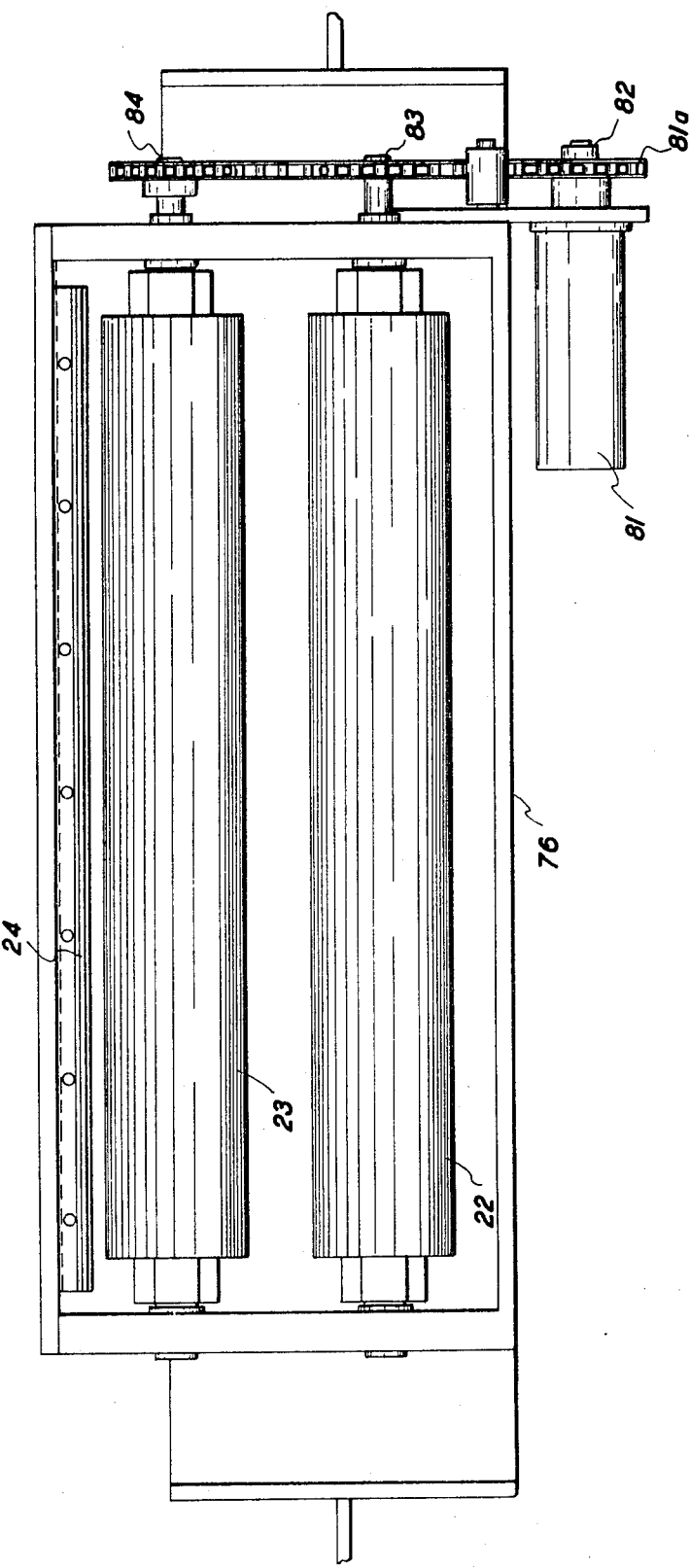
FIG. 33 is a plan view of the cleaning assembly used by the machines of FIGS. 1 and 15.

The cleaning rollers 22 and 23 are journaled for rotation in the sidewalls of tank 76 (FIG. 33) and include an outer layer of fibrous material 78. The tank 76 is filled with cleaning fluid to a level sufficient to submerge at least a portion of rollers 22 and 23. Rotating the rollers wets the outer layers 78. When the shuttle electrode passes, the image forming surface of the electrode is scrubbed by the wet outer layers of the rollers. The cleaning fluid applied to the electrode 13 by rollers 22 and 23 is wiped off the electrode by the rubber squeegee 24 as the carriage travels past it toward the turn position.

The cleaning rollers are driven by the shunt wound DC electric motor 81 coupled to the rollers by the continuous chain 81a carried on and mated with the sprockets 82, 83 and 84. The sprockets are coupled to the shafts of the rollers 22 and 23 and the armature of the motor 81 respectively. The direction of rotation of the motor armature is reversible to rotate the rollers counterclockwise when the shuttle electrode travels toward the turn position and clockwise when returning toward the park position.

The cleaning fluid in tank 76 is continuously cycled through a filter by a constant displacement fluid pump and appropriate conduits to remove unwanted objects therefrom. An electrostatic filter is particularly advantageous for removing charged photosensitive ink particles from the cleaning fluid. An electrostatic filter subjects the cleaning fluid to an electric field and electrically pulls the charged particles from the fluid.

IMAGING ASSEMBLY

Figure 7:
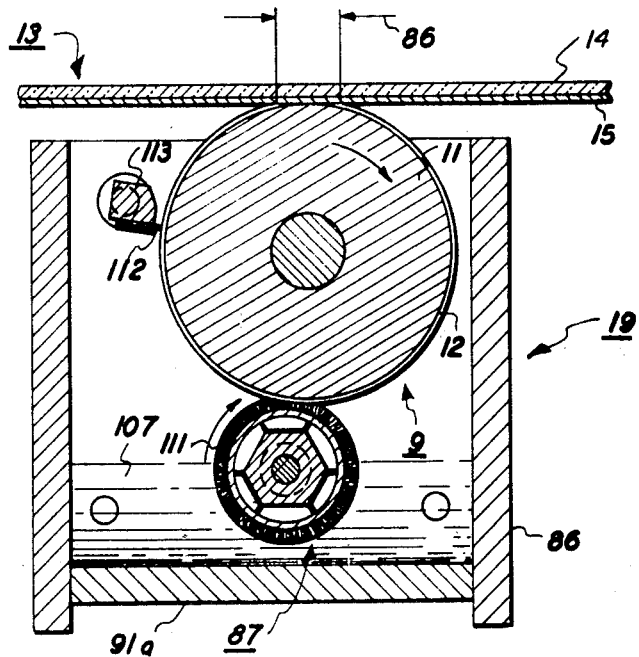
FIG. 7 is a cross-sectional view of the imaging assembly shown in FIG. 6 including an isolated view of the shuttle electrode.

The imaging assembly 19 houses the imaging or blocking electrode 9 which along with the shuttle electrode 13 is used to establish an electric field across the photoelectrophoretic ink for forming an image. The imaging assembly also houses the photoelectrophoretic ink and the means for applying the ink between the electrodes 9 and 13. When assembly 19 is raised to an operable position by the elevator mechanism 21b, the periphery of the imaging electrode 9 (specifically the electrical insulating layer 12) physically contacts the image bearing surface on the shuttle electrode 13 (specifically the tin oxide layer 15) as the shuttle electrode travels thereby. The area of contact between the two electrodes 9 and 13 defines a nip having a finite width 86 (FIG. 7). The nip width results from forcing the roller 9 against the plate 13 thereby flattening the normally cylindrical shape of the roller. The dimension of the nip width is controlled by adjusting the elevation to which the assembly 19 is raised by the elevator mechanism 21b.

A photoelectrophoretic ink is stored in the assembly 19 and applied to the surface of the imaging electrode roller 9 by inking roller 87. This ink is of course carried to the nip because of the rotation of the imaging electrode roller. The desired image is formed from the ink present in the vicinity of the nip that is exposed to activating electromagnetic radiation in imagewise configuration, i.e., a light image, and subjected to an electric field. The light image has substantially length only i.e., is a line, and is projected to the nip by mirrors and a lens in the optical assembly 28. The electrical field is established by electrical voltage potentials coupled to the electrodes 9 and 13. A full frame image of an original resting on platen 26 is produced on the shuttle electrode in a line by line fashion as the shuttle electrode travels past the image electrode 9 raised to an operable position by the elevator mechanism 21b.

The imaging roller electrode 9 may be used to electrophoretically deposit a layer of photoelectrophoretic ink on the shuttle electrode 13. In this case, the ink at the nip between the shuttle and imaging electrodes is not exposed to light energy. Consequently, the ink particles of a common charge polarity are attracted by the electric field to the tin oxide layer 15 (FIG. 7) of the shuttle electrode 13. These particles are exposed to a light image at the development assembly 20 to form the desired image of the original. The role of the development assembly 20 is discussed in detail elsewhere but may be considered for the present to be substantially the same as that of the imaging assembly.

Figure 8:
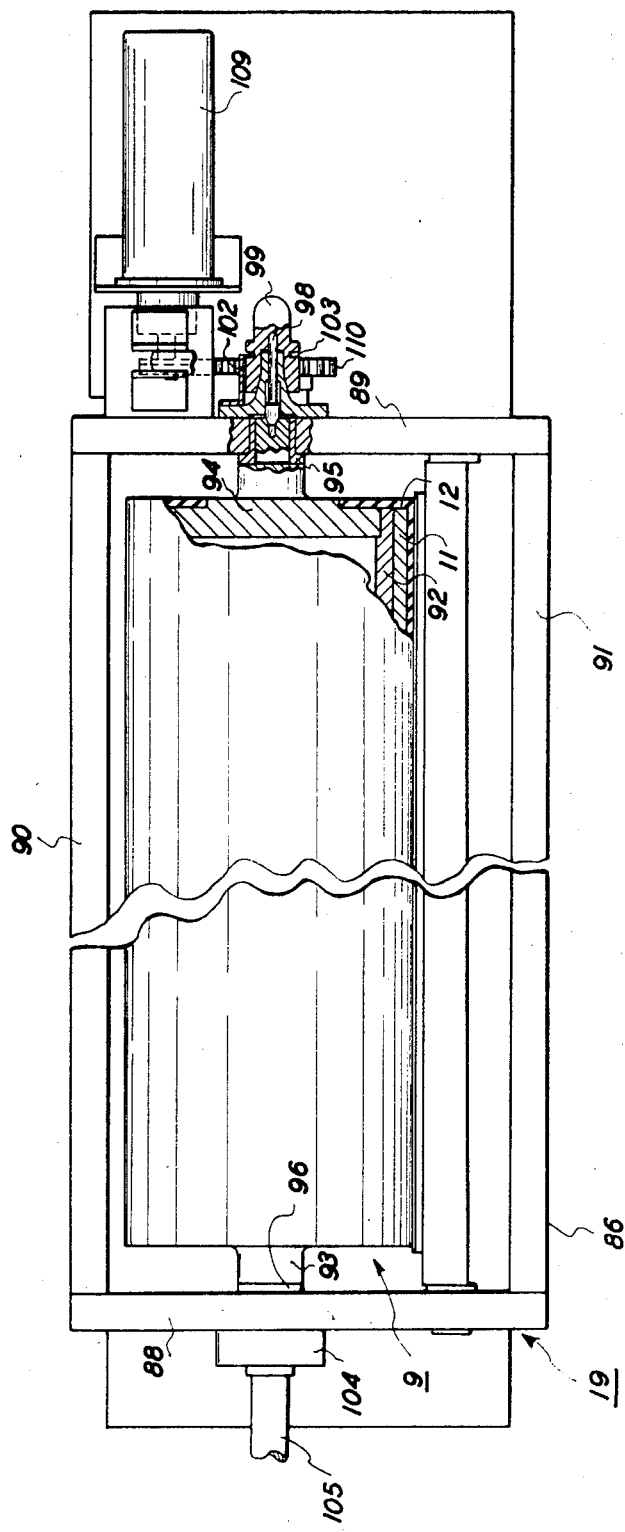
FIG. 8 is a plan view of the imaging assembly shown in FIG. 6.

The tank 86 is the structural frame for the imaging assembly 19 (FIGS. 6, 7 and 8) and comprises the end walls 88 and 89, the sidewalls 90 and 91 and the floor 91a. Referring to FIG. 8, the imaging electrode 9 includes the hollow metal cylinder 92 having ends capped by electrically conductive hubs 93 and 94. A conductive rubber material 11 is fit over the metal cylinder 92 and the rubber is in turn covered by an electrically insulating material 12. The hubs 93 and 94 are rotatably fit into flanged bearings 95 and 96 mounted in the end walls 88 and 89. The male electrical connector 98 is rigidly coupled to the hub 94, mates with the female electrical connector 99 and is free to rotate with roller 9 relative to the female connector. The spring clip 102 snaps into the groove 103 on the female connector to keep the male and female connectors mated.

The imaging electrode roller 9 is driven by the shaft 105 rigidly coupled to the hub 93. The shaft 105 is rotatably fit within the collar 104 to lend structural support to the shaft.

Figure 14:
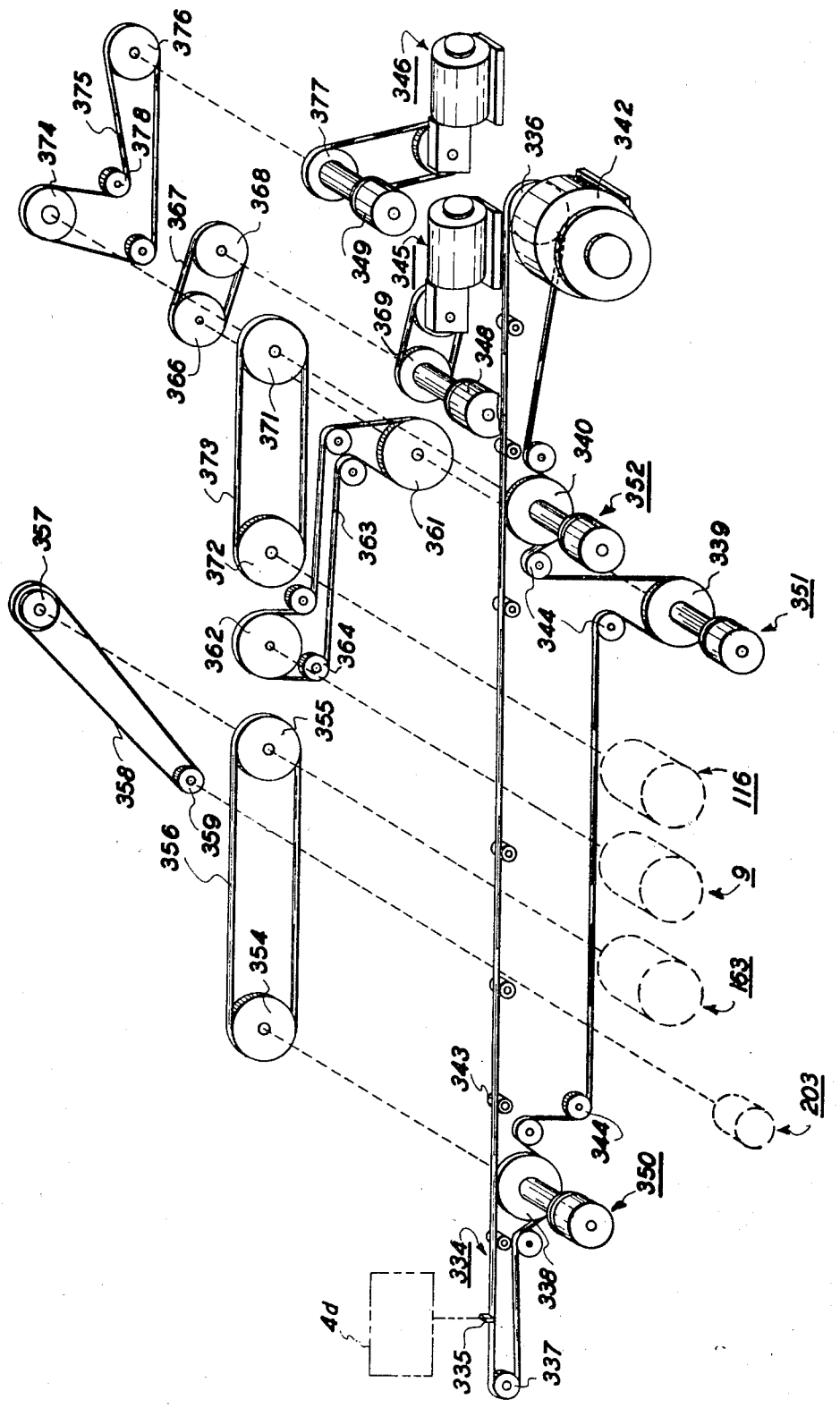
FIG. 14 is a schematic, exploded representation of the drive mechanism used by the machine of FIGS. 1 and 15.

Shaft 105 is coupled by appropriate chains and sprockets to the drive mechanism shown in FIG. 14.

The tank 86 is filled with a photoelectrophoretic ink to a level 107 (FIG. 7) so as to at least partially submerge the inking roller 87. The inking roller is journaled for rotation in the end walls of tank 86 by appropriate bearings. The sprocket 108 (FIG. 6) is coupled to the inking roller and is driven clockwise by the shunt wound DC electric motor 109 through the link chain 110. The inking roller includes an outer layer of fibrous material 111 which abuts the periphery of the imaging roller 9. The photoelectrophoretic ink adheres to the fibrous material and is spread or coated onto the imaging electrode roller 9 when the two rollers rotate.

The photoelectrophoretic ink coated onto the imaging roller is smoothed out to a substantially uniform thickness by the action of the knife edge 112. The knife edge is set a precise distance from the periphery of roller 9 to establish the desired thickness of the ink on roller 9. The knife edge is mounted on the shaft 113 journaled in the end walls 88 and 89 of the tank 86. The distance between the knife edge and the roller 9 is adjusted by rotating shaft 113 thereby moving the knife edge closer or further away from the periphery of roller 9. The lock nut 114 locks shaft 113 to a particular angular position when the desired spacing is established between the knife edge and the imaging roller.

DEVELOPMENT ASSEMBLY

Figure 4:
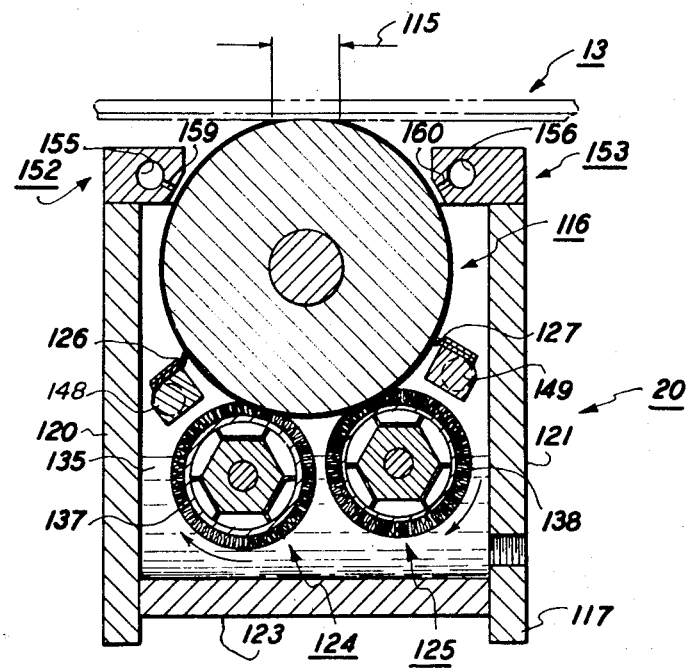
FIG. 4 is a cross-sectional view of the development assembly shown in FIG. 3 including an isolated view of the shuttle electrode.

The development assembly 20 houses the developing electrode 116 which is structurally and functionally substantially similar to the imaging roller 9. An immediately apparent difference between the imaging and development assemblies is that substantially no new ink is added to the image on the shuttle electrode as it passes the development assembly. The developing electrode is in fact a second imaging roller for the machine. It is used to establish an electric field across the photoelectrophoretic ink applied to the shuttle electrode 13 in imagewise configuration at the imaging electrode. When raised to an operable position by elevator mechanism 21c, the developing electrode physically contacts the passing shuttle electrode at a nip having the width 115 (FIG. 4). The nip width is a result of forcing the developing electrode against the shuttle electrode and is controlled by varying the elevation to which the development assembly is raised. An electric field is established across the nip by voltage potentials coupled to the electrodes 13 and 116. The ink on the shuttle electrode in the vicinity of the nip is exposed to substantially the same light image to which it was exposed at the imaging electrode by means of the optical assembly 29. This subsequent exposure of the ink to the light image with an electric field being applied improves the quality of the image particularly if a polychromatic ink is employed. When a polychromatic ink is used the multiple exposure to light results in improved color separation.

A second and subsequent exposure of the ink on the shuttle electrode in the presence of an electric field provides a method for controlling the various photographic parameters of the image such as gamma and maximum and minimum density. By way of example, the parameter control may be effected at least in part by varying the intensity of the light source projecting the image of the original, restricting the light being projected to specific wavelengths and/or varying the voltage potentials applied to the various electrodes. A particularly unique advantage of the present machine is that the shuttle electrode passes the development assembly twice during a normal machine cycle wherein the carriage 4 travels from the park to the turn position and returns to the park position. This effectively adds more imaging or developing electrodes to the system thereby giving greater opportunity for controlling image parameters. The elevator mechanisms can be used to reduce the number of electrodes by maintaining an electrode at an inoperative position. The lesser number of exposures may be desired when using a monochromatic ink.

It was pointed out in the description of the imaging assembly that the imaging roller 9 may be used to electrophoretically deposit ink particles of a common charge polarity on the shuttle electrode. For that situation, the desired image is actually formed for the first time at the developing electrode 116. The image is formed at the developing electrode in the same manner as at the imaging electrode because at each electrode the photoelectrophoretic ink is subjected to a field and exposed to a light image. The main functional difference between the assemblies 20 and 19 is simply the manner in which the ink is applied to the nip or image forming zone.

Figure 3:
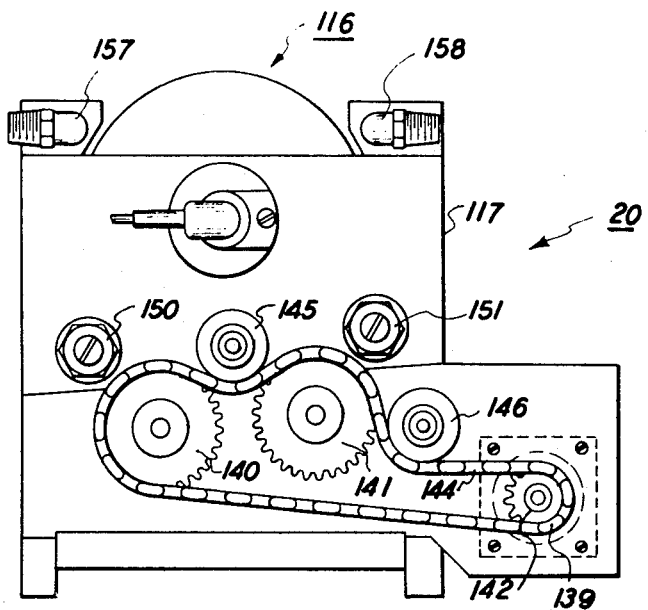
FIG. 3 is an end elevation view of the development assembly used by the machine of FIGS. 1 and 15.
Figure 5:
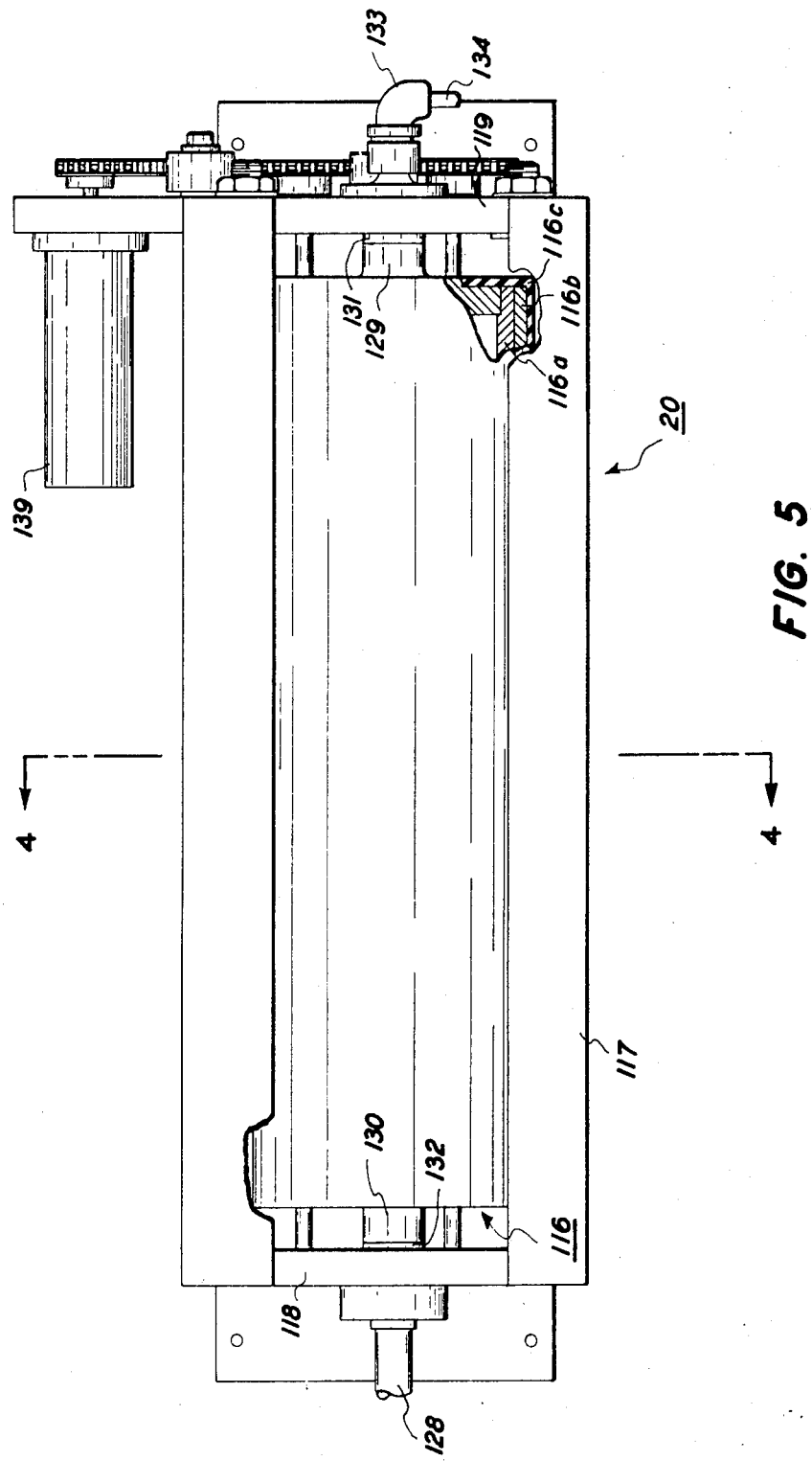
FIG. 5 is a plan view of the development assembly shown in FIG. 2.

Turning now to FIGS. 3, 4 and 5, the tank 117 is the structural frame for the development assembly and includes the end walls 118 and 119, the side walls 120 and 121 and the floor 123. The development electrode 116, the brush rollers 124 and 125 and the squeegees 126 and 127 are all mounted between the end walls 118 and 119. The development electrode roller 116 is substantially identical to the imaging electrode roller 9 in that it comprises a metal cylinder 116a having a layer of conductive rubber 116b covered by an outside layer of electrically insulating material 116c. The hubs 129 and 130 of the development electrode are journaled for rotation in the end walls by the bearings 131 and 132. The female electrical connector 133 is mated with a male connector on hub 129 in the same manner as connectors 98 and 99 are coupled to the imaging roller 9. The electrical lead 134 electrically couples the development electrode to an appropriate voltage source.

The brush rollers 124 and 125 are substantially identical and each are journaled for rotation in the end walls of tank 117 by appropriate bearings. The brush rollers have fibrous outer layers 137 and 138 which contact the periphery of the developing electrode roller 116. The tank 117 is filled with an electrically insulating fluid (normally the same fluid comprising the photoelectrophoretic ink liquid carrier) to a level 135 that is sufficient to wet the fibrous layer on the rollers. The rollers are driven by the shunt wound DC electric motor 139 to wet and to scrub the surface of the development electrode. The sprockets 140, 141 and 142 are coupled to the shafts of the brush rollers and the armature of the motor respectively and carry the link chain 144. The idler rollers 145 and 146 are used to adjust the tension in the link chain.

The flexible rubber squeegees 126 and 127 are mounted on the shafts 148 and 149 which in turn are journaled by appropriate bearings in the end walls of tank 117. Locknuts 150 and 151 are coupled to each shaft to lock them against rotation and provide means for adjusting the pressure exerted by the squeegees on the periphery of the developing roller 116. The squeegees wipe the surface of the developing electrode to assist the roller brushes 124 and 125 clean the electrode thereby permitting its continuous operation.

The manifolds 152 and 153 mounted on the sidewalls of tank 117 have channels or conduits 155 and 156 therein which extend substantially across the entire width of the developing electrode. The channels are connected by the hose couplings 157 and 158 and by appropriate pumps and piping to a supply of electrical insulating fluid (the same fluid comprising the photoelectrophoretic ink liquid carrier) and this fluid is sprayed onto the periphery of the developing electrode through the slits 159 and 160.

The manifolds 152 and 153 alternately spray fluid onto the developing electrode. During left to right travel of the shuttle electrode 13, the developing electrode 116 is rotated clockwise. During this time, a solenoid-operated valve in the fluid line coupled to manifold 152 is energized and a spray is emitted from manifold 152 to coat the developing electrode with an insulating fluid. The fluid arriving at the nip between the electrodes enhances the migration of photosensitive ink particles between electrodes. Meanwhile a solenoid operated valve in the fluid line coupled to manifold 153 is deenergized to prevent spraying from this manifold. During right to left travel of the shuttle electrode 13 the developing electrode is rotated counterclockwise. During this time, manifold 153 emits a spray and manifold 152 is inhibited.

The fluid in tank 117 is continuously cycled by appropriate pumps and piping through an electrostatic filter. The filter separates the photosensitive ink particles and contaminants from the insulating fluid to permit the reuse of the insulating fluid.

THE TRANSFER ASSEMBLY

The transfer assembly 18 (FIG. 2) effects the transfer of the image formed on the shuttle electrode to a supporting substrate. The substrate in the present embodiment is the web 27 of paper or other appropriate material. The image is held on the surface of the shuttle electrode primarily by electrical forces acting between the shuttle electrode and the ink particles comprising the image. By way of example, the ink particles comprising the image may carry negative charges and these particles will be electrostatically bonded to a grounded shuttle electrode. During image formation and development certain negatively charged particles migrate to a negatively biased imaging electrode 9 or developing electrode 116 because they undergo an apparent charge exchange with the shuttle electrode when exposed to light. Therefore, negatively charged particles remaining on the shuttle electrode forming the desired image can be removed from the shuttle electrode by applying a positive voltage potential to the transfer roller 163. Generally, the image is transferred in the absence of light by subjecting the particles comprising the image to an electric field having a polarity or direction opposite to that used to form or develop the image.

Figure 11:
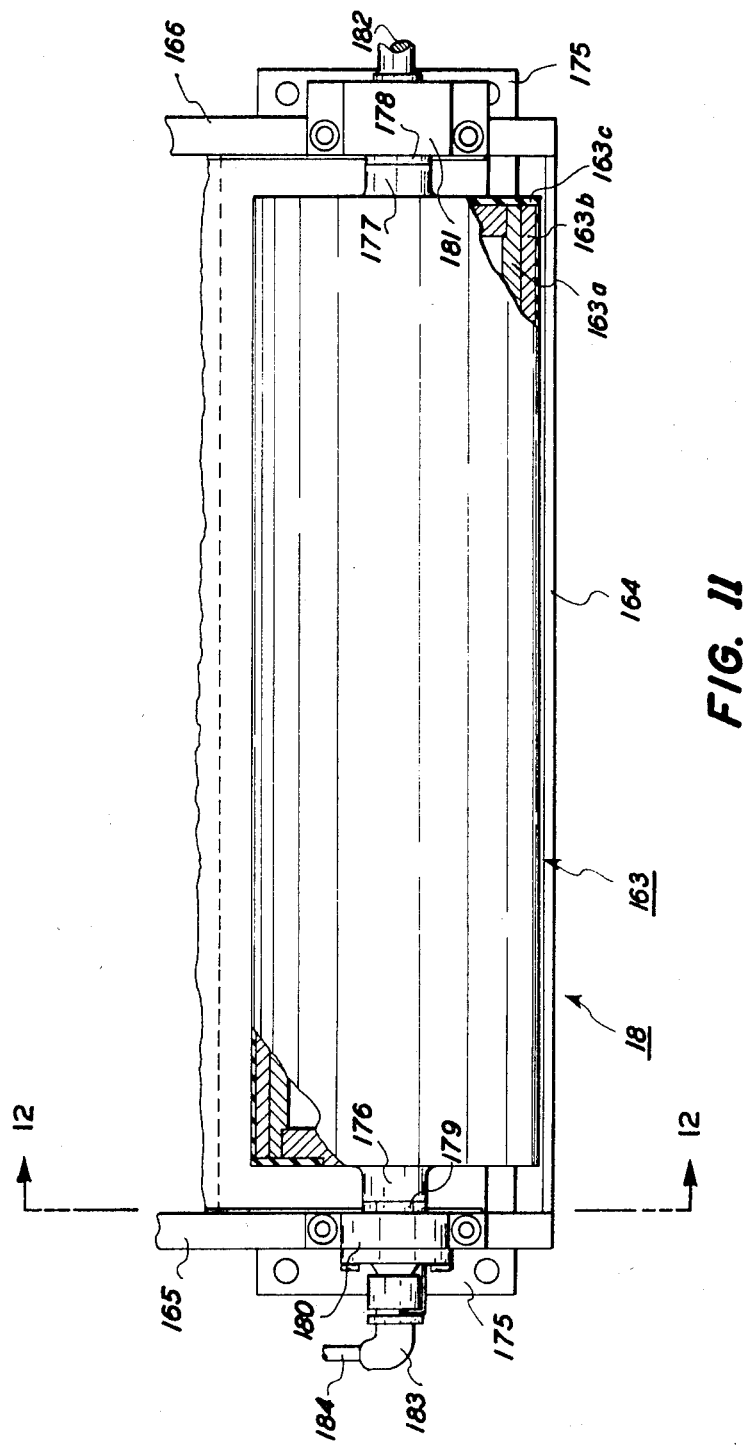
FIG. 11 is a partial plan view of the transfer assembly shown in FIG. 13.
Figure 12:
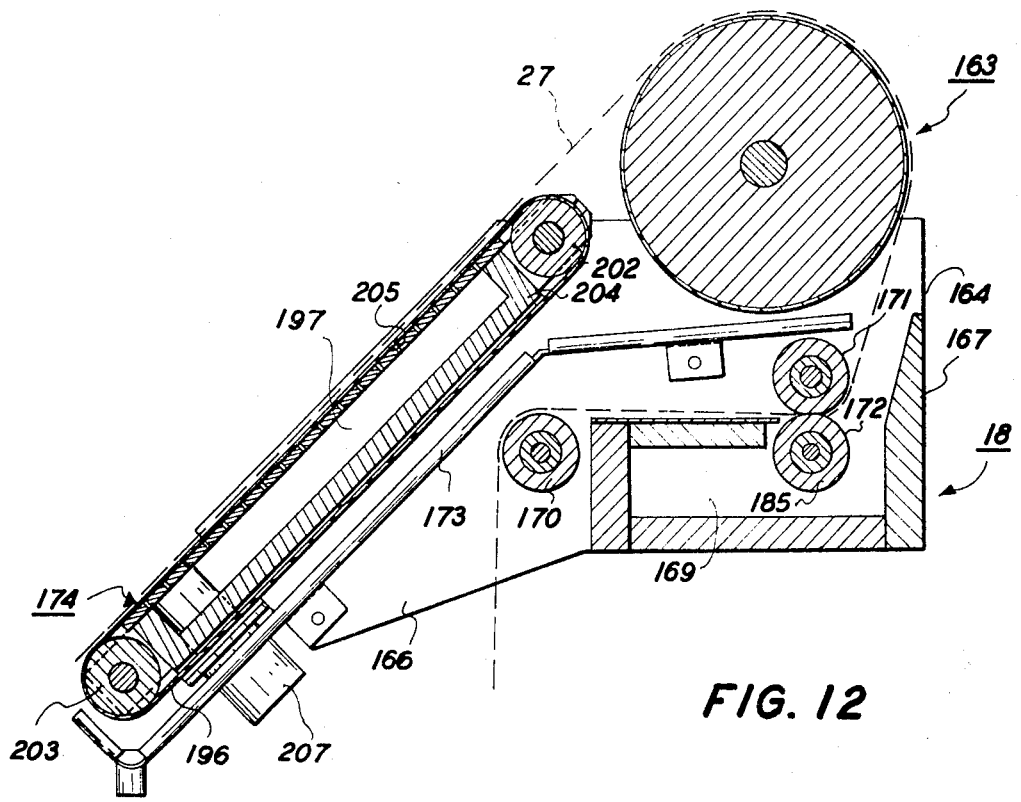
FIG. 12 is a cross-sectional view of the transfer assembly shown in FIG. 13.
Figure 13:
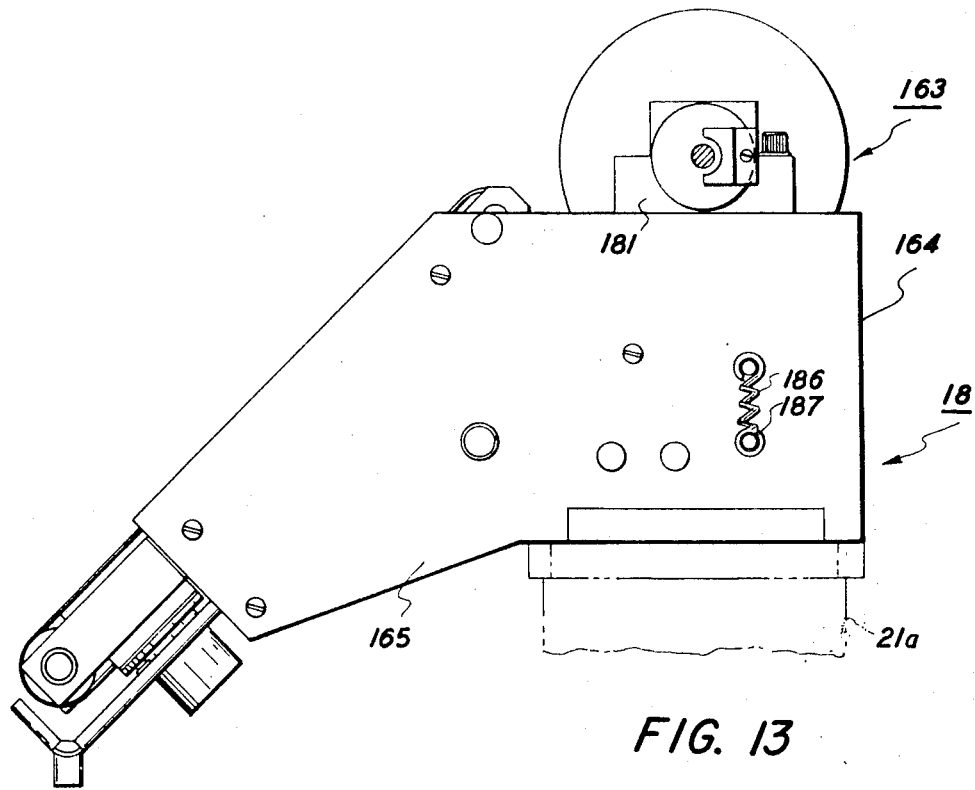
FIG. 13 is a side elevation view of the transfer assembly used by the machine of FIGS. 1 and 15.

Referring to FIGS. 11–13, the transfer assembly 18 includes the frame 164 comprised of the sidewalls 165 and 166 and the rear wall 167. The frame supports the transfer roller 163, the fluid tank 169, idler roller 170, pinch rollers 171 and 172, drip tray 173 and the vacuum transport assembly 174. The assembly has brackets 175 which are used to fasten it to a platform on elevator mechanism 21a.

The transfer roller 163 is structurally substantially similar to the imaging and developing electrodes 9 and 116 in that it is comprised of a metal cylinder 163a covered by a layer of conductive rubber 163b which is overcoated with an electrical insulating material 163c. The transfer roller is an electrode used to establish a field across the image in order to effect transfer of the image from the shuttle electrode. It is preferred but not necessary for the transfer roller to have the insulating layer 163c. The reason being that web 27 can be electrically insulating and thereby serve as the primary dielectric between the roller 163 and plate 13 used to establish the desired electric field.

The hubs 176 and 177 on roller 163 (FIG. 11) are journaled in the flanged bearings 178 and 179 which are in turn secured to the sidewalls 165 and 166 by the pillow blocks 180 and 181. The female electrical connector 183 is mated with male connector in hub 176 in the same manner as connectors 98 and 99 on the imaging roller. Electrical lead 184 couples the transfer roller to an appropriate voltage source. The transfer roller is rotated by shaft 182 which is powered by the drive mechanism represented schematically in FIG. 14.

Located beneath the transfer roller 163 is the wetting tank 169 which is filled with an electrical insulating fluid to a depth sufficient to at least partially submerge the pinch roller 172. The pinch roller 172 has a fibrous layer 185 for wetting the surface of web 27 that contacts the shuttle electrode. The web is fed through the pinch roller thereby rotating pinch roller 172 and in the process wetting the surface of the web with the insulating fluid. One reason the surface of the web is wet with the electrical insulating fluid is to increase the quantity of liquid carrier available to the photosensitive ink particles forming the image. This facilitates the migration of the particles under the influence of the field toward the transfer roller.

Pinch roller 171 is a hard metal roller journaled by appropriate bearings in the sidewalls of the transfer assembly. The hard roller 171 is biased against the soft roller or lower pinch roller 172 by two coil springs 186 (only one of which is shown). The soft roller 172 is journaled in the sidewalls by appropriate bearings which are fit into clearance holes 187 (FIG. 13) thereby permitting the bias springs to pull the soft rollers upward into contact with the hard rollers.

Figure 15:
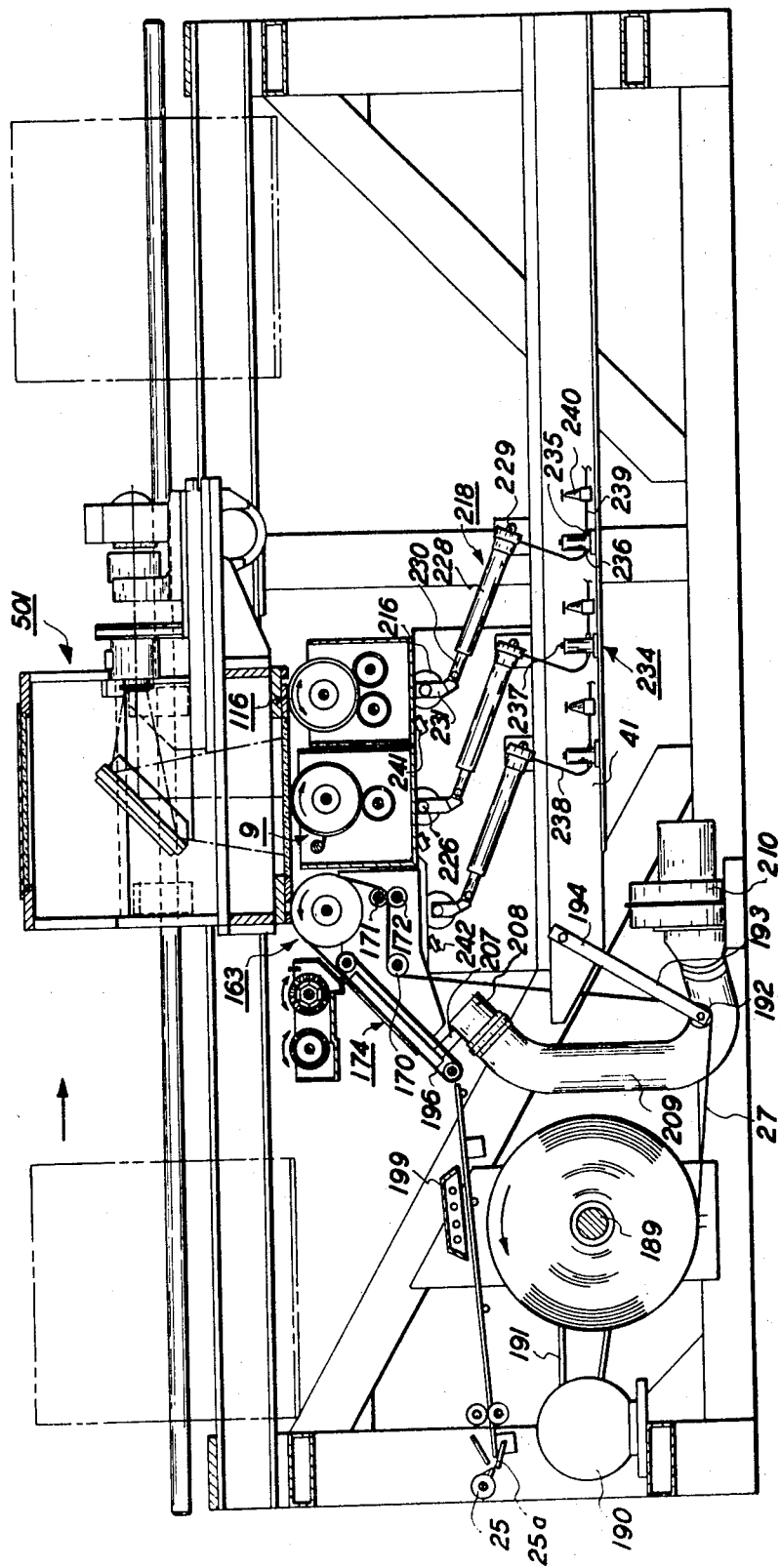
FIG. 15 is a cross-sectional view of the machine of FIG. 1 modified to produce copies of transparency originals.

The web 27 is wound on the spool 189 (FIG. 15) and is dispensed when the spool is rotated counterclockwise (as viewed in FIG. 15). The shunt wound DC electric motor 190 drives the spool by means of a drive mechanism including appropriate gears coupled to the motor armature shaft and the spool and chain 191. The web extends from the spool 189 and passes under the dancer rod 192, between two supporting arms 193, (only one of which is shown), over the idler roller 170, between the pinch rollers 171 and 172, over the transfer roller 163 and onto the vacuum transport assembly 174.

The web is fed through the machine by the combined action of the transfer roller 163, the shuttle electrode 13, the spool motor 190 and the dancer rod 192. The web is physically gripped between the transfer roller 163 and the shuttle electrode 13 when the transfer assembly 18 is raised to an operable position by the elevator mechanism 21a. The web is advanced onto the vacuum transport 174 when the transfer roller is rotated and the shuttle electrode travels thereby. The image is transferred to the web from the shuttle electrode in the process. While the web is being advanced, the slack in the web is taken up and the dancer-rod-supporting arms 193 are rotated clockwise. The arms 193 are rigidly connected to a shaft 194 which is journaled for rotation in the machine frame crossbeam 41. Coupled to shaft 194 is the throw arm of an electrical switch. The throw arm is thrown to a first switch position when the supporting arms 193 are rotated clockwise. The switch is wired into the control circuit for the spool motor 190 and energizes the motor when the throw arm is at the first switch position. This causes the web to be dispensed from the spool 189 allowing slack to build up and the dancer rod support arms 193 to rotate counterclockwise. The throw arm on the electrical switch is thrown to a second switch position at this time shutting off the motor 190.

The web 27 is dispensed from the spool 189 in the foregoing fashion on a demand basis. The demand is created primarily by the transfer roller 163 which rotates through a sufficient angular displacement to effect the transfer of the entire image from the shuttle electrode. As the web 27 is advanced onto the vacuum transport assembly it is tacked by a vacuum to the belts 196. After a finite number of images are transferred to the web, the web arrives adjacent the cutter bar 25. The cutter bar 25 has a helical cutting edge which acts in concert with the cutting edge on blade 25a to sever the web. Before an image bearing portion of web 27 reaches the cutter bar the image is permanently fixed to the web by the heat elements 199. The heat elements evaporate carrier liquid that may be present leaving behind the image-forming ink particles. When the cutter bar is rotated to sever the web, the cut portion (the desired copy) falls into the output tray 3.

The vacuum transport assembly 174 includes the continuous belts 196 (FIG. 12) mounted between the idler pulley 202 and the drive pulley 203. The drive pulley 203 is powered by the drive mechanism shown in FIG. 14. The vacuum chamber 197 is formed within an enclosed box 204 positioned between the belts 196 and has a plurality of holes or small openings in its top surface 205. The air pressure in chamber 197 is lowered below atmospheric pressure to pull web 27 toward the surface 205 and in doing so to tack the web to the belts 196. The air pressure in chamber 197 is lowered below atmospheric pressure by pumping air from the chamber through the conduit 207 (FIG. 15), fitting 208, hose 209 and the electric motor driven fan 210. The fitting 208 is an airtight box coupled on one face to the conduit 207 and coupled on another face to the hose 209. The fan 210 exhausts the air pumped from chamber 197 to atmosphere.

THE ELEVATOR ASSEMBLIES

The transfer assembly 18, the imaging assembly 19 and the development assembly 20 are mounted on the elevator assemblies 21a, b and c, respectively, so they may be raised and lowered into and out of operative positions. The operative positions of the assemblies are the positions at which the peripheries of the transfer 163, imaging 9 and developing 116 rollers of the respective assemblies are able to contact the passing shuttle electrode. The distance the various assemblies move is in the neighborhood of an one-eighth of an inch.

Figure 10:
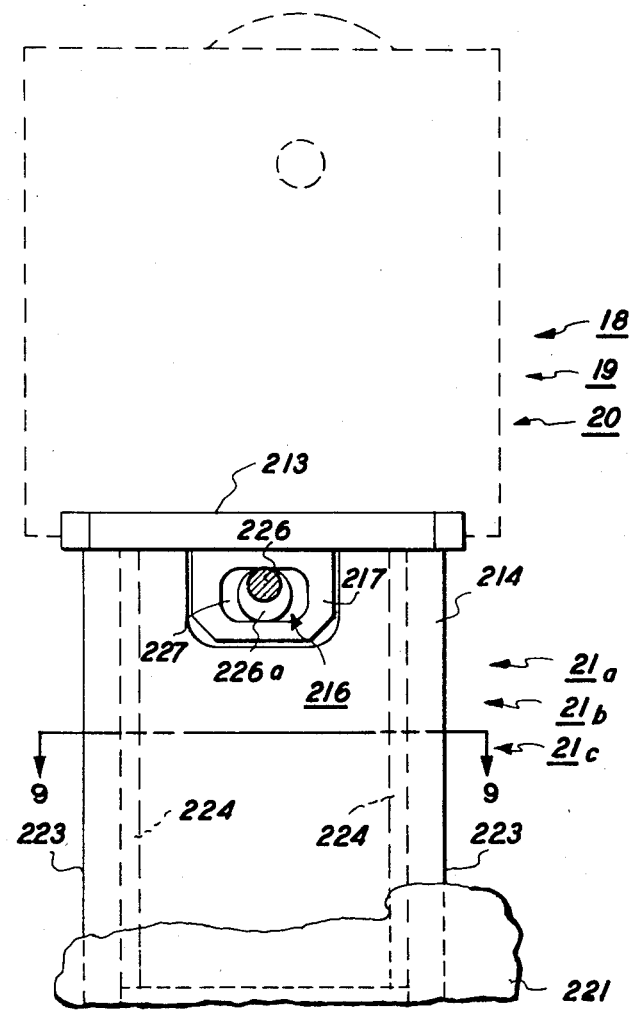
FIG. 10 is an elevation view of a portion of the elevator mechanism having a typical machine assembly supported thereon.
Figure 9:
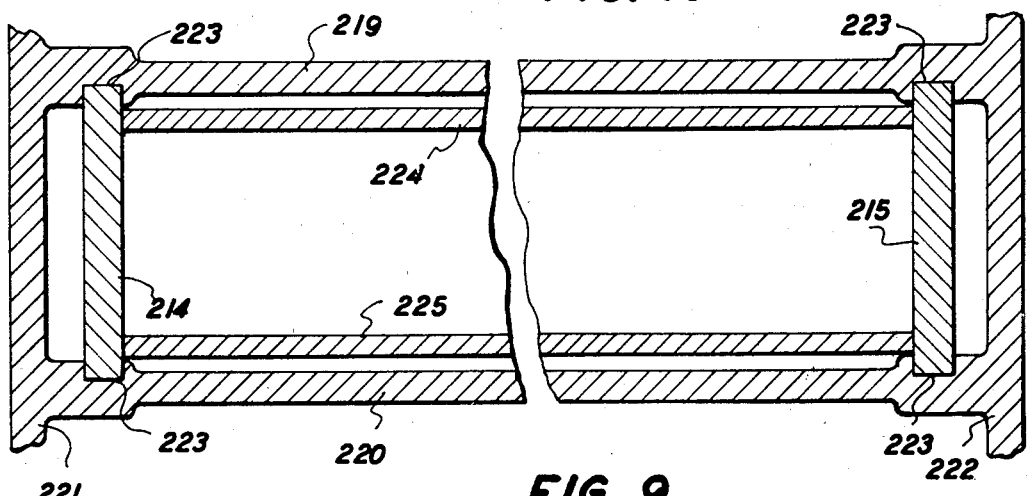
FIG. 9 is a cross-sectional view of the elevator assembly taken along lines 9—9 in FIG. 10.

The three elevator assemblies are substantially identical to one another therefore it is only necessary to discuss one of the assemblies in detail (FIGS. 9, 10 and 15). The assemblies include a platform 213 (FIG. 10) to which are coupled two leg plates 214 and 215, the cam 216, the cam followers 217 and a pneumatic cylinder 218. The platform rests on transverse plates 219 and 220 which extend across the width of the machine frame between two sideplates 221 and 222. The transverse plates have vertical grooves 223 into which the leg plates 214 and 215 are slidably fit. The brace members 224 and 225 are used to structurally support the leg plates.

The platform 213 and consequently the assembly carried by it is raised and lowered by the action of a lift mechanism including the cam and cam follower 216 and 217 and the cylinder 218. The cam is a circular disc 226a mounted eccentrically on shaft 226. The shaft 226 is journaled for rotation in the sideplates 221 and 222. The cam follower 217 is a metal bracket fastened to the platform 213 and has a hole 227 cut therein the edge of which rides on the edge of the disc 216. Rotating the camshaft 226 therefore raises and lowers the cam follower and consequently the platform 213.

The camshaft 226 is rotated by the fluid operated (pneumatic) cylinder 218. Cylinder 218 is pivotally connected at its barrel 228 (FIG. 15) to the machine frame by pin 229. The cylinder piston rod 230 extends from the barrel 228 and is pivotally connected by a pin to the lever arm 231 which is in turn rigidly connected to the camshaft 226. The camshaft 226 is rotated clockwise when the piston rod 230 is extended from the cylinder barrel and is rotated counterclockwise when the piston rod is retracted back into the cylinder barrel. The extension and retraction of the piston rod effects the raising and lowering of the platform.

The extension and retraction of the cylinder piston rod is controlled by the solenoid operated, fluid flow direction control valve 234 (FIG. 15). Valve 234 includes an intake orifice 235, an outlet orifice 236 and the relief orifice 237. The intake orifice is coupled to a pressurized air source through the piping 239 and the pressure regulator 240. The outlet orifice is coupled to the barrel of cylinder 228 by the piping or hose 238. The relief orifice is open to atmosphere. The normal condition or state of valve 234 is with the outlet and relief orifices in fluid communication, i.e., coupled to one another, and the inlet orifice blocked. When the valve solenoid is energized, the intake and outlet orifices are in fluid communication, i.e., coupled to one another, and the relief orifice is blocked. Therefore, the piston rod 230 of a cylinder is extended when the solenoid on valve 234 is energized because pressurized air or other gas is fed into the cylinder barrel and displaces the piston rod. The piston rod is retracted when the solenoid is deenergized because the weight of the platform 213 pushes the piston rod back into the cylinder barrel expelling the air in the barrel to atmosphere through the relief orifice 237.

The elevation to which the various assemblies 18-20 are raised by the elevator mechanisms is varied by means of the stop block 241 and setscrew 242. The setscrew is mated with the stop block and extends therethrough. The lever arm 231 abuts the setscrew 242 when it is rotated clockwise by cylinder 218. By physically limiting the angle through which the lever arm 231 can be rotated, the setscrew limits the angle through which the cam 216 is rotated and consequently the elevation to which the platform 213 is raised. Adjusting the position of the set screw within the stop block provides the means for varying the elevation to which an assembly 18-20 is raised.

The drive mechanism shown in FIG. 14 transmits power to rollers 9, 116 and 163 by means of a link chain 334. There is sufficient play or slack in chain 334 to permit the rollers to be moved by the elevator assemblies without adversely affecting the rotation of the rollers.

THE OPTICAL ASSEMBLIES

The optical assemblies 28 and 29 project line images of an opaque original on platen 26 to the nips or interfaces between the shuttle electrode 13 and the imaging 9 and developing 116 electrodes respectively. A line-by-line scan of the entire original placed on platen 26 is accomplished as the carriage 4 (which carries both the platen 26 and shuttle electrode 13) travels past the optical assemblies.

Figure 32:
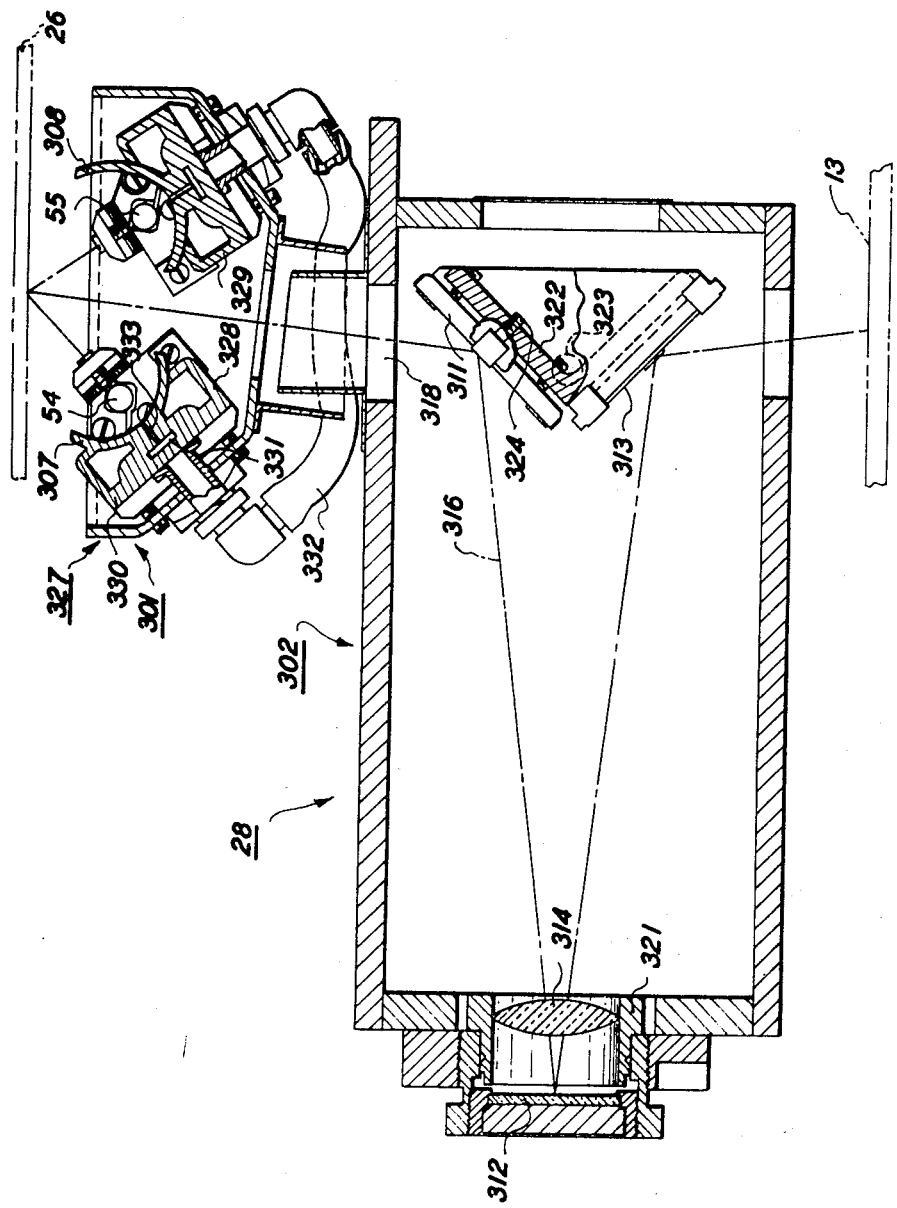
FIG. 32 is a partial end elevation, cross-sectional view of the lamp-reflector assembly and projection section of an optical assembly shown in FIG. 2.

The optical assemblies 28 and 29 are substantially identical to each other. Assembly 28 includes the lamp-reflector section 301 and the projection section 302. Assembly 29 includes the lamp-reflector section 303 and the projection section 304. The lamp-reflector sections 301 and 303 are substantially identical to one another and are partially enclosed by the common light shield 305 located between the lamps-reflector sections and the substantially identical projection sections 303 and 304. An enlarged, isolated view of optical assembly 28 (also typical of assembly 29) is shown in FIG. 32.

Lamps 54-57 are elongated, high-intensity electromagnetic radiation energy source devices and are mounted generally parallel to platen 26 and extend substantially across the width of the platen. The light energy (electromagnetic radiation) produced by lamps 54 and 55 (lamps 56 and 57 in assembly 29) is directed to a common area on the platen 26 by the elliptical reflectors 307 and 308. The center of this light flooded area is projected downward to the periphery of imaging electrode 9 (developing electrode 116 in the case of assembly 29) by plane mirrors 311, 312 and 313 and by a lens 314. The mirror 312 is positioned at a distance relative to lens 314 that substantially coincides with the nodal point of the lens. Consequently, an object at the light flooded area of the platen reflected by mirror 311 through lens 314 is reflected by mirror 312 back through lens 314 to the mirror 313. Mirror 313 directs the light image downward to the image plane at the nip formed between the shuttle and a roller electrode.

The mirrors 311, 312 and 313 are used to make the physical distance between the platen and shuttle electrode less than the optical distance illustrated by light ray 316 extending from lens 314 to an object on the platen and from lens 314 to an image at a nip between the shuttle electrode and a roller electrode. A reason for the foregoing is to make the imaging system compact while allowing an original on the platen to fit within the field of view of lens 314. The mirrors reflect the optical path into a plane generally parallel to the platen and shuttle electrode, i.e., they fold the optical path, to permit the physical distance between the platen and shuttle electrode to be less than the length of the optical path.

The mirrors 311 and 313 are mounted on bracket 322 substantially at right angles to each other. When the bracket is locked in position, each mirror is at a 45° angle to a light ray normal to the platen and shuttle electrode. The light rays 316 and 317 illustrating the optical paths do not intercept the platen or shuttle electrode at 90°. The reason for this is best illustrated by examining the path followed by a light ray normal to the platen and shuttle electrodes. The normal light ray is deflected off the 45° mounted mirror 311, passes through lens 314 and is reflected by mirror 312 back through lens 314 back to mirror 311 rather than to mirror 313.

An odd number of mirrors (three) is used in the optical assemblies to obtain at the nip a reverse reading positive image of the original as viewed from beneath the imaging roller 9 (developing roller 116 in the case of assembly 29) looking upward toward the platen 26. The reverse reading positive light image gives rise to the creation of a reverse reading positive image on the shuttle electrode 13 from the photoelectrophoretic ink. When this reverse reading image on the shuttle electrode is transferred to the web 27 at transfer assembly 18 it is a right reading positive image.

The light images to which the photoelectrophoretic ink is exposed at the imaging and developing electrodes are substantially identical because the optical paths through assemblies 28 and 29, indicated by the rays 316 and 317 are substantially symmetrical. One difference between the two optical assemblies is that they are physically oriented 180° relative to each other. Nonetheless, the optical paths 316 and 317 are such that a line on platen 26 is projected by both optical assemblies through substantially the same line on the shuttle electrode 13 and consequently are said to be similar. The net result is that the image projected through the shuttle electrode by optical assembly 29 is in registration (overlays in one to one alignment) with the same image projected through the shuttle electrode by the optical assembly 28. The mirrors 311 and 313 are tilted about orthogonal axes to obtain the desired alignment of the two optical paths 316 and 317.

Figure 34:
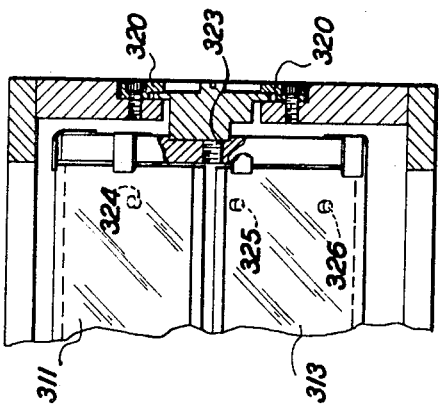
FIG. 34 is a partial, transverse, cross-sectional view of the projection section of the optical assembly shown in FIG. 32.

Projection enclosures 303 and 304 of the two optical assemblies are mounted on the horizontal angled beams 36 of the machine frame (FIG. 2). The enclosures provide the mountings for the lenses and mirrors used to establish the optical paths 316 and 317. Also, the enclosures are dark rooms which pass to the photoelectrophoretic ink below through apertures 318 and 319 a desired portion of the electromagnetic energy produced by the lamps. The lens 314 and backing mirror 312 are contained in a lens barrel 321 securely mounted in a wall of an enclosure. The mirrors 311 and 313 are supported by an angled bracket 322 rotatably coupled to opposite walls of an enclosure by means of pins 323. A pin 323 (best seen in FIG. 34) is rigidly attached to the bracket and rotatably fit into a wall of the enclosure. Locknuts 320 are coupled to one of the pins to lock the bracket against movement. The locknuts are released to allow the mirrors to be tilted and thereby adjust the optical path through the enclosure. Setscrews 324, 325 and 326 are mounted in the brackets along the edges of the mirrors 311 and 313 (as viewed in FIG. 32 and 34) to tilt the mirrors about an axis orthogonal to the axis of pins 323.

The lamp reflector sections 301 and 302 of the two optical assemblies include means to support the lamps and reflectors and means for directing a cooling fluid onto the lamps. Sections 301 and 302 are mounted above the enclosures 303 and 304 respectively and each section includes a dish 327 located over an aperture 318 in a projection enclosure. (The dish 327 includes an appropriate mating aperture to allow passage of the light images.) Cradles 328 and 329 (FIG. 32) are attached to the dish on either side of the aperture 318. Each cradle includes a reflector, e.g., reflector 307, a manifold, e.g., manifold 330, and means for supporting a lamp, e.g., lamp 54. The cradle also includes the electrical connectors required to apply electrical power to the lamp. The manifolds have conduits 331 extending generally the length of a lamp, e.g., lamp 54. The conduits 331 are coupled at one end of a manifold to a hose 332 which in turn is coupled to a source of pressurized air (or other pressurized fluid source). The air is fed through a hose 322, conduit 331 and slit 333 onto the lamp, e.g., lamp 54. The air, or other fluid, directed onto the lamp is used to help control the temperature of the lamp and in turn the energy output of the lamp.

THE DRIVE MECHANISM

FIG. 14 illustrates schematically an exploded view of the drive mechanism for machine 1. Some motors, gears and etc., are mounted directly on the cleaning, imaging and development assemblies, 17, 19 and 20 and operate substantially independently of the drive mechanism of FIG. 14. These driving apparatus are discussed in connection with the specific assemblies on which they are employed. Generally, those drive apparatus are used to power cleaning brushes and the like. The FIG. 14 drive mechanism on the other hand propels the carriage 4 and the transfer, imaging and developing rollers 9, 116 and 163 during an operation cycle of machine 1. All the gears, pulleys, motors, etc., shown in FIG. 14 are appropriately journaled and fastened to the machine frame.

The formation of images by machine 1 is synchronized to the movement of carriage 4. The movement is imparted to the carriage by a continuous link chain 334 (illustrated as a belt) to which the carriage is attached by means of a linking member 335 illustrated schematically in FIG. 14. The linking member is attached to both the chain 334 and carriage 4 (represented by the phantom lines 4d) causing the carriage to slide along rails 6 and 7 between park and turn positions whenever chain 334 is moved.

The drive chain 334 is carried principally by the sprockets 336, 337, 338, 339 and 340. Sprocket 336 is the drive sprocket being coupled to the armature of motor 342, a DC shunt wound electric motor. Sprocket 336 is positioned near the right end of the machine frame at a point that allows the carriage to reach the turn position. Conversely, sprocket 337 is mounted at the left end of the machine frame at a point that allows the carriage to reach the park position. A plurality of idler sprockets 343 are positioned along chain 334 between the drive sprocket 336 and end sprocket 337 to help support the chain. In addition, idler sprockets 344 are used near the transfer 338, imaging 339 and developing 340 sprockets to assist the mating of the chain with these sprockets. Sprockets 344 are mounted to permit their location to be shifted relative to chain 334 thereby enabling the tension in the chain to be adjusted.

Motor 342 powers the transfer 163, imaging 9 and developing 116 rollers in addition to the carriage 4. A single drive apparatus is used to drive both the carriage and rollers to obtain a translational speed for the shuttle electrode 13 that is substantially the same as the surface speed of a point on the peripheries of the rollers. Matching speeds in this manner minimizes the possibility of the rollers smearing or streaking the images formed on the shuttle electrode. Auxiliary motors 345 and 346 are used to drive the imaging 9 and developing 116 rollers independently of motor 342 at times when those rollers are not performing their primary functions. The reasons for the independent drive include overcoming inertia and coating ink and cleaning fluids onto the surfaces of the rollers. The auxiliary clutches 348 and 349 couple the power of the auxiliary motors to the imaging and developing rollers. The main clutches 350, 351 and 352 couple the power of the main motor 342 to the three rollers 163, 9 and 116. All the clutches are solenoid operated and transmit power when energized and block its passage when deenergized.

The transfer roller 163 is driven solely by motor 342 through the drive apparatus including sprocket 338, clutch 350, intermediate sprockets 354 and 355 and link chain 356 (illustrated as a belt). When the solenoid on clutch 350 is energized, the rotation of sprocket 338 is transmitted by the clutch to sprocket 354, chain 356 and sprocket 355. Sprocket 355 is coupled to shaft 182 on the transfer roller. Sprocket 355 also drives sprocket 357, link chain 358 (illustrated as a belt) and sprocket 359. Sprocket 359 is coupled to the shaft of pulley 203 on the vacuum transport 174 in the transfer assembly 18. Pulley 203 drives the belts 196 and is rotated whenever the transfer roller 163 is rotated.

The imaging roller 9 is powered by motor 342 by means of the drive apparatus including sprocket 339, clutch 351, intermediate sprockets 361 and 362 and link chain 363 (illustrated as a belt). When the solenoid on clutch 351 is energized, the rotation of sprocket 339 is transmitted by clutch 351 to sprocket 361, chain 363 and sprocket 362. Sprocket 362 is coupled to shaft 105 (FIG. 8) of the imaging roller 9. The idler sprockets 364 help support chain 363 and are mounted so they can be shifted to adjust the tension in the chain 363.

Sprocket 361 (and therefore the imaging roller) is also coupled to sprocket 366, link chain 367 (illustrated as a belt) sprocket 368, sprocket 369, auxiliary clutch 348 and auxiliary motor 345. When the solenoid on clutch 348 is energized the power of motor 345 is applied through clutch 348 to sprocket 369, to sprocket 368, chain 367, sprocket 366 and sprocket 361. Sprocket 361 drives sprocket 362 which is coupled to the imaging roller 9.

Figure 6:
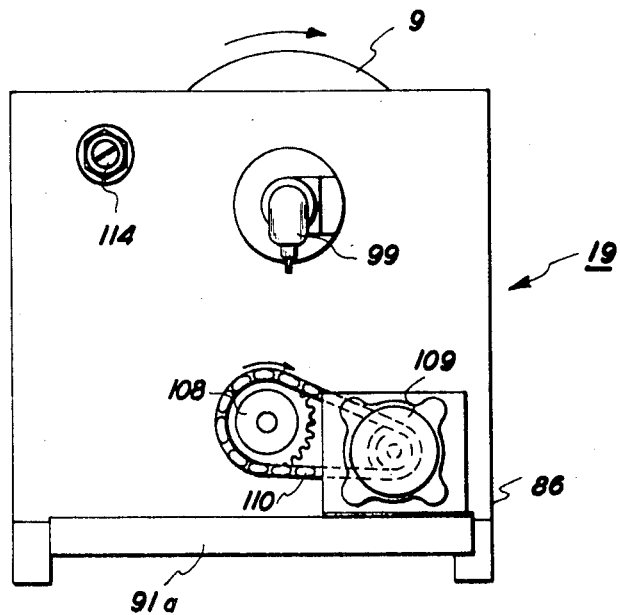
FIG. 6 is an end elevation view of the imaging assembly used by the machine of FIGS. 1 and 15.

The solenoids on main and auxiliary clutches 351 and 348 are electrically wired such that only one is energized at a time. If clutch 351 is energized clutch 348 is deenergized and vice versa. This mode of operation prevents motors 342 and 345 from simultaneously driving sprocket 361 and hence imaging roller 9. The auxiliary motor is used to drive the imaging roller at a speed substantially that required during imaging so that when the roller 9 is coupled to chain 334 no substantial shock due to roller inertia is felt by the main drive chain 334. Also, rotation of roller 9 prior to making contact with the shuttle electrode insures that the entire periphery of roller 9 is coated with ink by the inking roller 87 (FIGS. 6, 7 and 8).

The developing electrode roller 116 is coupled to the main drive motor 342 by means of the sprocket 340, solenoid-operated clutch 352, intermediate sprockets 371 and 372 and link chain 373 (illustrated as a belt). Sprocket 371 is coupled to sprocket 340 through the clutch 352 and to the developing roller 116 by the chain 373 and sprocket 372. Sprocket 372 is coupled to shaft 128 (FIG. 5) of the developing roller.

Sprocket 371 is also coupled to auxiliary motor 346 by means of sprocket 374, link chain 375 (illustrated as a belt), sprocket 376, sprocket 377, and auxiliary clutch 349. When the solenoid on clutch 349 is energized, the power of motor 346 is transmitted from sprocket 377 through the clutch to sprocket 376, chain 375, sprocket 374 and consequently to sprocket 371. Sprocket 371 transmits the power to the developing roller 116 as described above. The idler rollers 378 help support chain 375 and are mounted so they can be shafted relative to the chain to adjust the tension in the chain.

The solenoids on the main and auxiliary clutches 352 and 349 are wired such that only one clutch is energized at one time. This is done to prevent both motors 342 and 346 from attempting to drive roller 116 at the same time. An independent drive is provided for the developing roller for reasons similar for using an independent drive to power the imaging roller. Namely, motor 346 is used to rotate roller 116 at an angular speed such that a point on its periphery has substantially the same speed as the shuttle electrode. This minimizes the effects of transient loads on motor 342 when the roller 116 is coupled to the main drive chain 334 by clutch 352. Also, rotating roller 116 prior to energizing clutch 352 insures that its surface is cleaned prior to coming into contact with the shuttle electrode.

THE TRANSPARENCY OPTICAL ASSEMBLY

The transparency optical assembly 501 (FIGS. 15 and 16) projects a full frame light image of a transparency original held in tray 502 over the entire image bearing area of the shuttle electrode 13. The opaque optical assemblies 28 and 29, on the other hand, project a light image having substantially length but no width. Nevertheless, images are formed substantially in a line-by-line manner with assembly 501 as the shuttle electrode travels past the imaging 9 and developing 116 rollers because the image-forming vicinity is still confined to the general area of the nips between the shuttle electrode and the rollers. Machine 1 is converted from the opaque original to the transparency original mode of operation by removing the tunnel housing 43, optical enclosure 8 and the opaque optical assemblies 28 and 29 and by mounting assembly 501 onto carriage 4. FIG. 15 illustrates machine 1 with assembly 501 mounted thereon.

The assembly 501 (FIG. 16) includes a frame 503 which is appropriately fastened to carriage 4. Mounted on frame 503 are a plane mirror 507 and a transparency slide projector including the light source 504, the condensing lens housing 505, the transparency original supporting tray 502 and the projection lens barrel 506. The light source includes a tungsten bulb 509 mounted within the air baffle and light shield 510. The bulb is cooled by ambient air pumped to the lamp by the blower 511. The light (electromagnetic radiation) generated by bulb 509 is collated by a condensing lens mounted in housing 505 and illuminates a transparency original in tray 502.

The light image passing through the transparency original is projected to the shuttle electrode 13 by lenses in barrel 506 and the mirror 507. The lens barrel 506 includes an inner barrel 506a which is slidably supported within a larger barrel 506b in order to properly focus the light image at the nip between the shuttle electrode and rollers. The lens in barrel 506 also effect a magnification of the original. The extremities of the projected light image are represented by the rays 512. Mirror 507 alters the optical path of rays 512 by directing them downward onto the shuttle electrode. Mirror 507 is supported by a frame 513 which in turn is mounted by appropriate means on the assembly frame 503. The mirror also converts the right reading positive light image projected by the lenses in barrel 506 to a reverse reading positive light image as viewed beneath the shuttle electrode looking up toward the mirror 507. The reverse reading light image contributes to the production of a reverse reading image on the shuttle electrode that is right reading when transferred to web 27.

The operation of machine 1 is substantially the same when modified to include the transparency optical assembly 501 (FIG. 15). The carriage travels along rails 6 and 7 between park and turn position. Image formation takes place on shuttle electrode 13 at the imaging 9 and developing 116 electrodes. The image is transferred to web 27 at the transfer roller 163 and is ultimately delivered to the collection tray 3 (FIG. 1). One advantage offered to machine 1 by the transparency optical assembly is that light, and specifically light in imagewise configuration, is made available at the transfer roller 163 because assembly 501 moves with the shuttle electrode and directs light over its entire image-forming area. Consequently, transfer of an image to web 27 can be made with electromagnetic radiation playing an active role in the transfer process.

The transparency original can be removed (ejected) from the tray 502 before the transfer is to take place to flood an image with a uniform light pattern. In this situation, the polarity of the voltage applied to the transfer roller is the same as that applied to the imaging and developing rollers. Substantially all the ink particles on the shuttle electrode comprising the image have the same polarity. The uniform light pattern therefore causes substantially all these ink particles to undergo a change in polarity and to migrate toward the transfer roller.

The transparency original can be left in tray 502 and light in imagewise configuration can be used to effect the transfer. In this situation, the polarity of the voltage applied to the transfer roller is opposite to that applied to the imaging and developing electrodes. The ink particles comprising the image migrate to the transfer roller and ink particles not separated from the image earlier at either the imaging 9 or developing 116 electrodes remain behind on the shuttle electrode. The particles remaining behind experience a change in charge polarity as a result of the exposure to the light image and remain attached to the shuttle electrode rather than migrate with the image-forming particles. Transferring with imagewise light therefore effectively constitutes a subsequent imaging or developing step.

THE ELECTRICAL CIRCUITRY

The operation of machine 1 is controlled substantially by the electrical circuitry shown in FIGS. 17–31. These circuits supply the electrical voltages and currents to motors, lamps, relays and other apparatus and help establish the sequence in which the various machine functions occur. In regard to the latter, the machine timing is controlled in large part by a bank of 28 cam-operated switches which indicate the position of carriage 4 during its travel between the park and turn positions. The cams are coupled to a common shaft which is driven through appropriate gearing by the main drive motor 342 (FIG. 14). The position of the cams on the common shaft are adjusted to actuate the switches associated with the cams at particular points during the travel of the carriage.

Throughout the following description and the drawings, the switch contacts of a relay are identified by the reference number of the relay followed by a letter of the alphabet. The switch contacts of the cam-operated switches are designed by reference numbers preceded by the letters LS.

Figure 17:
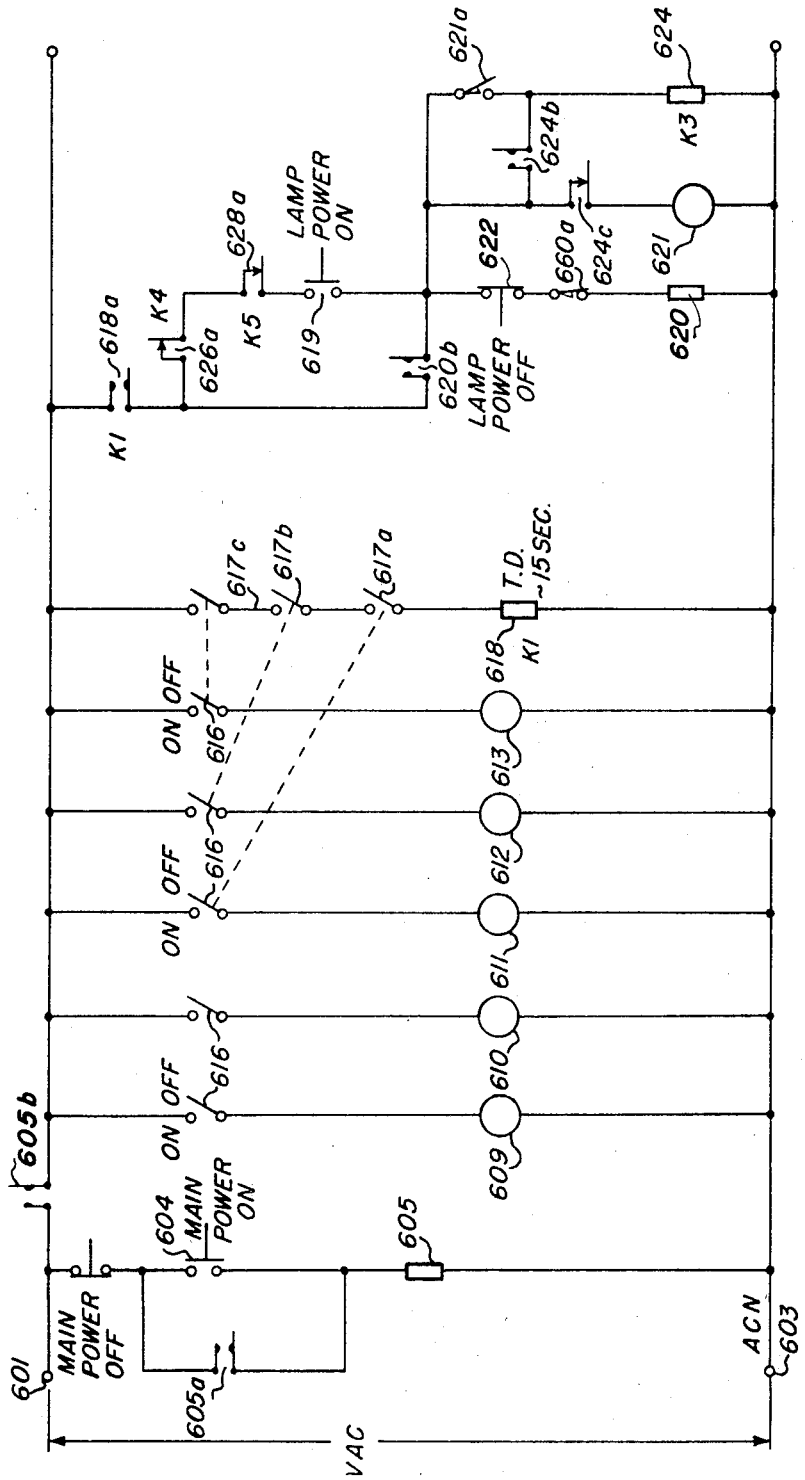
FIGS. 17–31 are simplified schematic illustrations of the electrical circuits employed by the machine of FIGS. 1 and 15.

Turning now to FIG. 17, power on terminal 601 is coupled to a 120-volt, 60-cycle line and terminal 603 is coupled to an AC neutral line (ACN), i.e., an AC return line. Closing the power-on switch 604 momentarily connects relay 605 between terminals 601 and 603. Thereafter relay 605 is latched between the input terminals through its own contacts 605a. Contacts 605b of energized relay 605 make the line voltage available to the blower motors 609–613. Motor 609 powers a fan for exhausting air from the optical enclosure 8 (FIGS. 1 and 2). Motor 610 powers the blower 210 (FIG. 2) used to create a vacuum in the vacuum transport assembly 174. Motors 611 and 612 drive blowers for pumping air into the two optical assemblies 28 and 29 through the hoses 52 and 53. Motor 613 powers a blower for circulating ambient air between the bonnet 66 and walls 58 and 59 of the optical enclosure. The blowers are turned on by means of the manual selector switches 616. As the blowers supplying cooling air to the lamps 54–57 (FIG. 2) are turned on, switches 617a, b and c are closed and apply the line voltage (the voltage coupled to terminal 601) to time delay relay 618.

About 15 seconds from the time switches 617a, b and c are closed, the normally open contacts 618a close thereby making the line voltage available to relay 620 through "lamp power on" switch 619 and "lamp power off" switch 622. Switch contacts 620d–g of relay 620 make the line voltage available to four lamp control circuits (FIG. 31 being typical) for driving lamps 54–57. Contacts 620b latch relay 620 to the line voltage and energize the lamp warm up timer motor 621. Contacts 621a on timer 621 close after approximately a 4 to 5-minute delay to couple the line voltage to relay 624. Contacts 624a (FIG. 18) pass an "autobus" voltage to other parts of the circuit which is used for the automatic operation of machine 1.

WEB MONITORING

The web 27 is monitored for quantity and paper breaks by a cam follower 550 which rides on the surface of the web spool or alternatively on the web itself as indicated in FIG. 2. When the thickness of the spool is small, indicating a lower paper supply, the switch contacts 625a (FIG. 18) are closed by the cam follower thereby energizing relay 626. Should the web 27 break, the cam follower moves even further thereby closing switch contacts 625b and energizing relay 628. Contacts 626a and 628a are used in the circuitry of FIG. 17 to stop machine operation if the paper supply is low or the paper breaks.

MODE SELECTION

Figure 16:
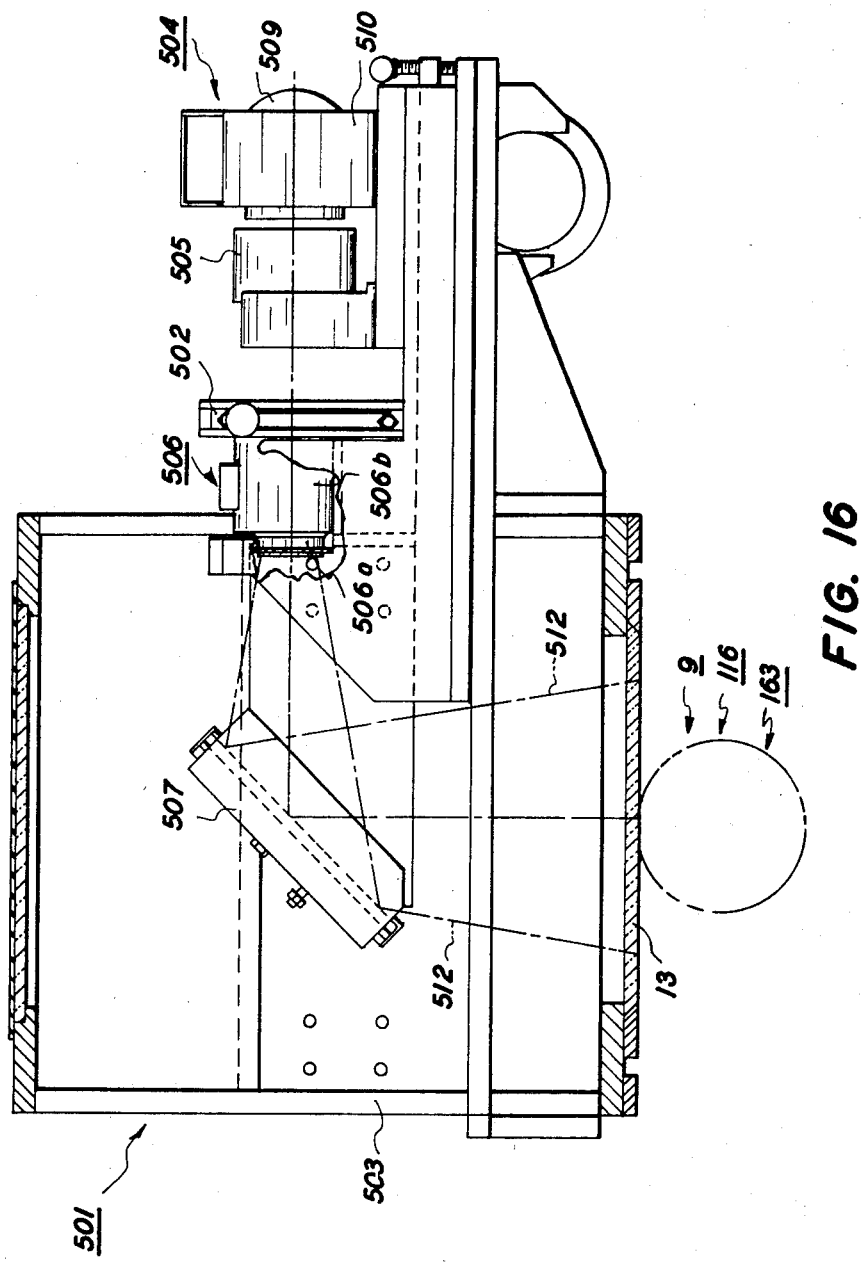
FIG. 16 is an enlarged, isolated view of the carriage, roller electrode, and transparency optical assembly shown in FIG. 15.

Mode switch 631 (FIG. 18) is thrown from an opaque mode position to a transparency mode position when copies are to be made from transparency originals using the apparatus of FIGS. 15 and 16 rather than from opaque originals. Relay 632 is energized through switch 631 and the "autobus" voltage is passed through contacts 632a. Mode switch 631 therefore permits the warm up period of timer 621 to be avoided in the transparency mode because lamps 54–57 are not used in this mode.

AUTOBUS VOLTAGE

The "autobus" voltage passed by relay contacts 624a (or alternatively contacts 632a) initiates several portions of the electrical circuitry. The power supplies 634 and 635 (FIG. 19) are energized by the "autobus" voltage. These power supplies generate the voltages for the electrostatic filters 636 and 637 through which the fluids in the cleaning assembly 17 and development assembly 20 are circulated. Pumps 639 and 640 (FIG. 19) are used to circulate the fluid in the cleaning 17 and developing 20 assemblies through the filters 636 and 637. These pumps are also energized by the "autobus" voltage.

WEB FEED CONTROL

The "autobus" voltage is connected to one terminal of the "dancing bar" switch contacts 637. Contacts 637 (FIG. 19) are closed when slack is taken up in web 27 (FIG. 2) and causes relay 638 to be energized. The normally open contacts 638a close to apply the line voltage to motor 190. Motor 190 feeds the web 27 off the spool until the slack accumulates and switch contacts 637 open. Motor 190 is shut off at this time because relay 638 is deenergized and contacts 638a return to their normally open condition.

MAIN MOTOR CONTROL

Figure 18:
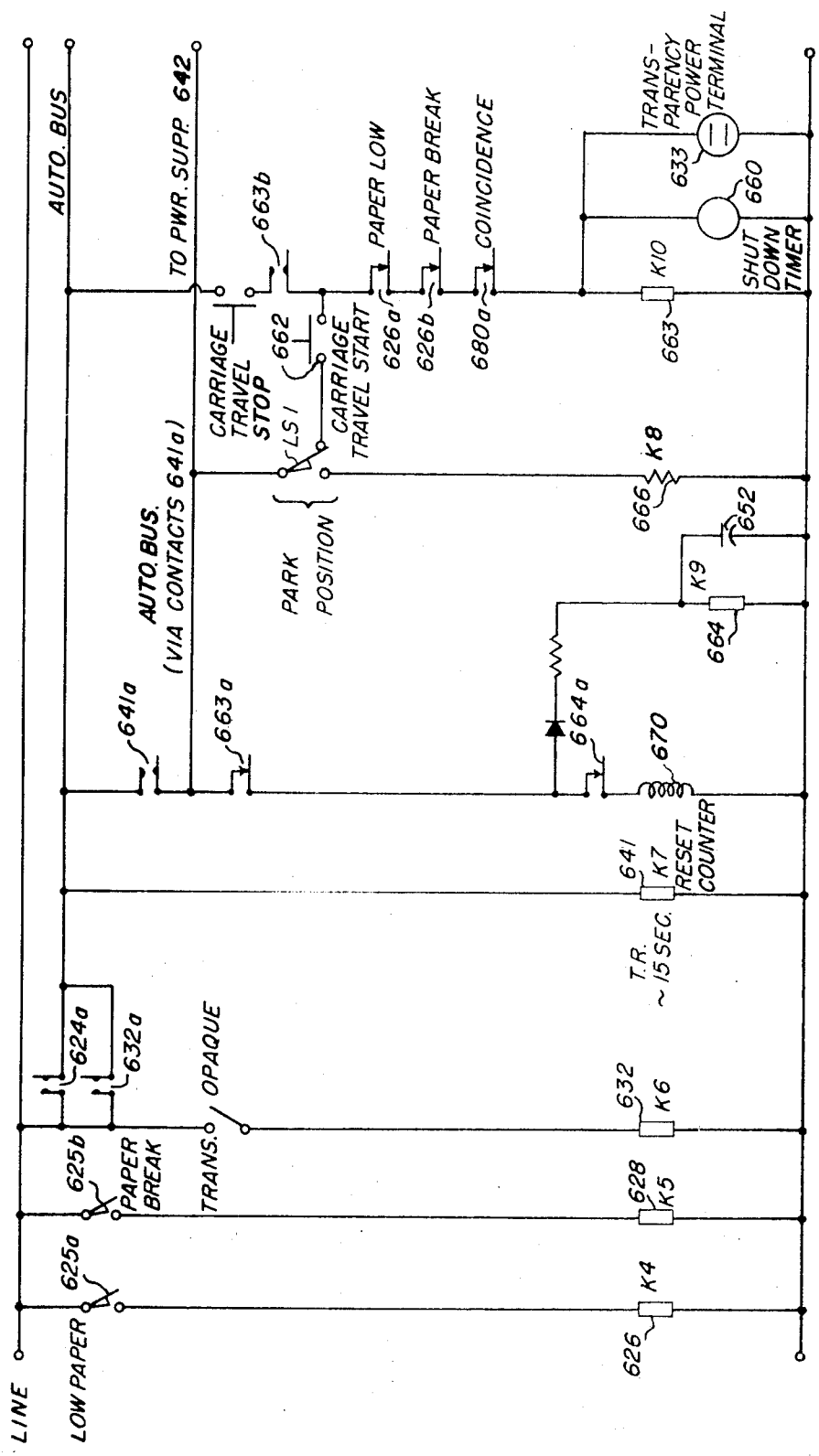
Figure 19:
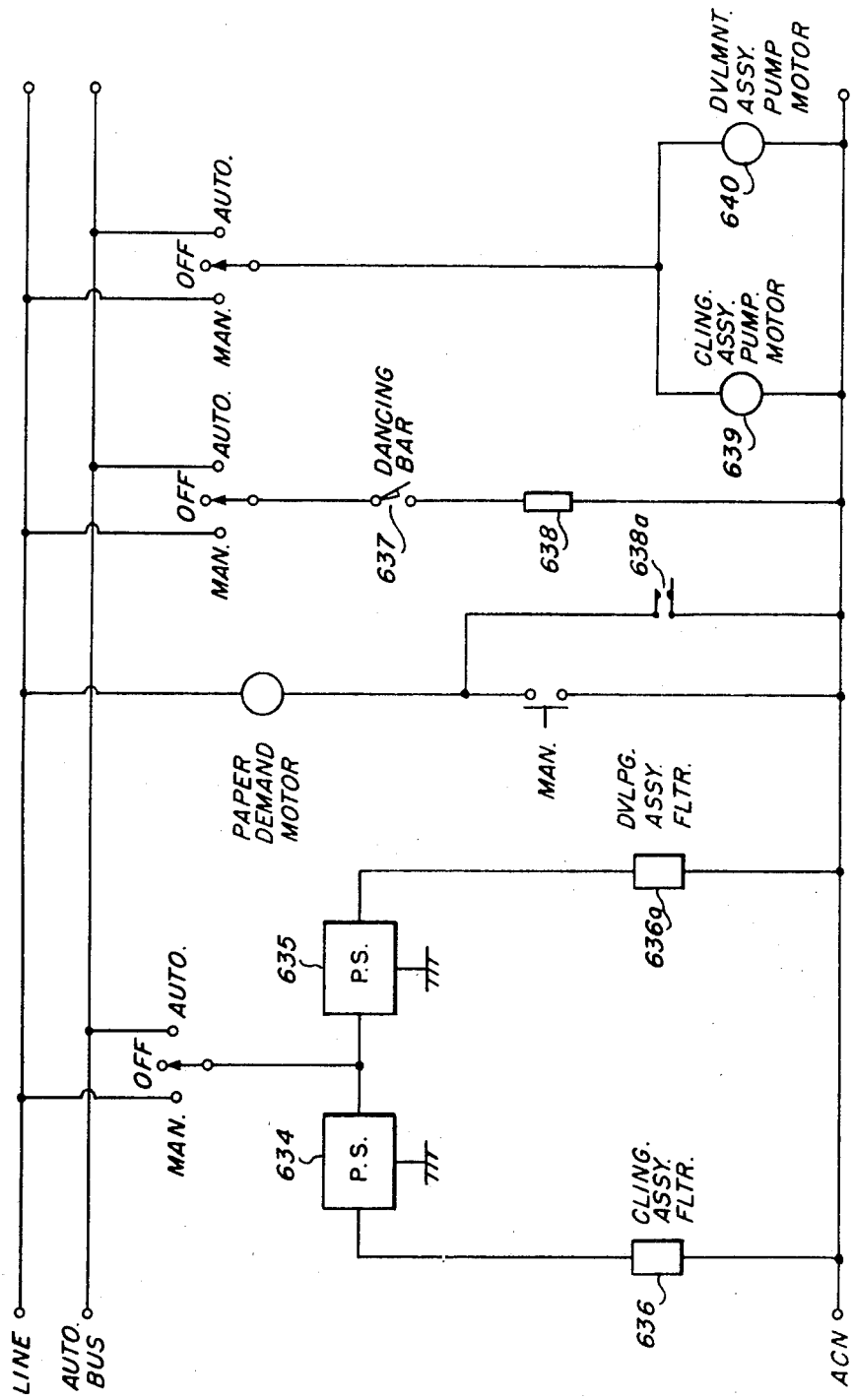
Figure 20:
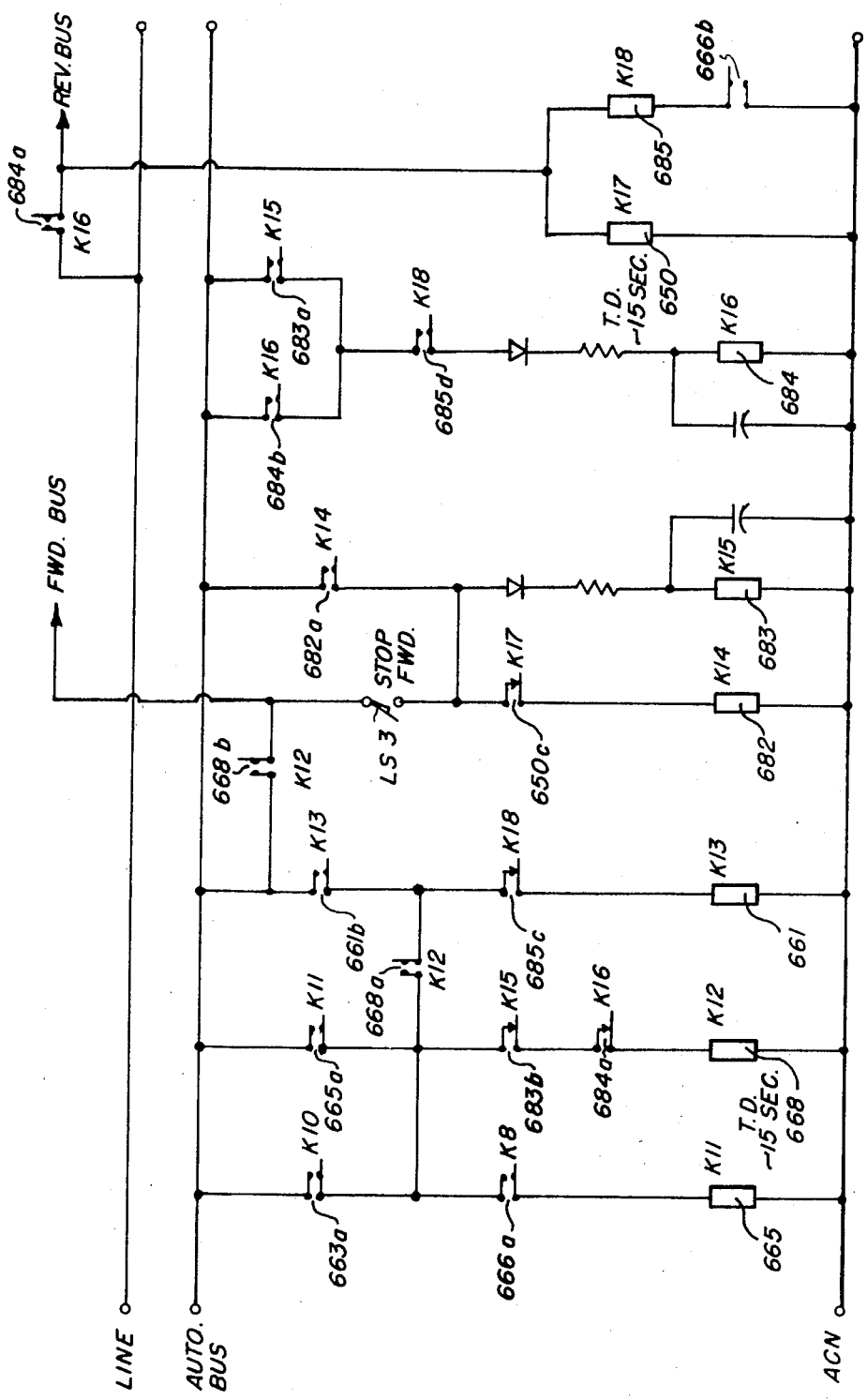
Figure 21:
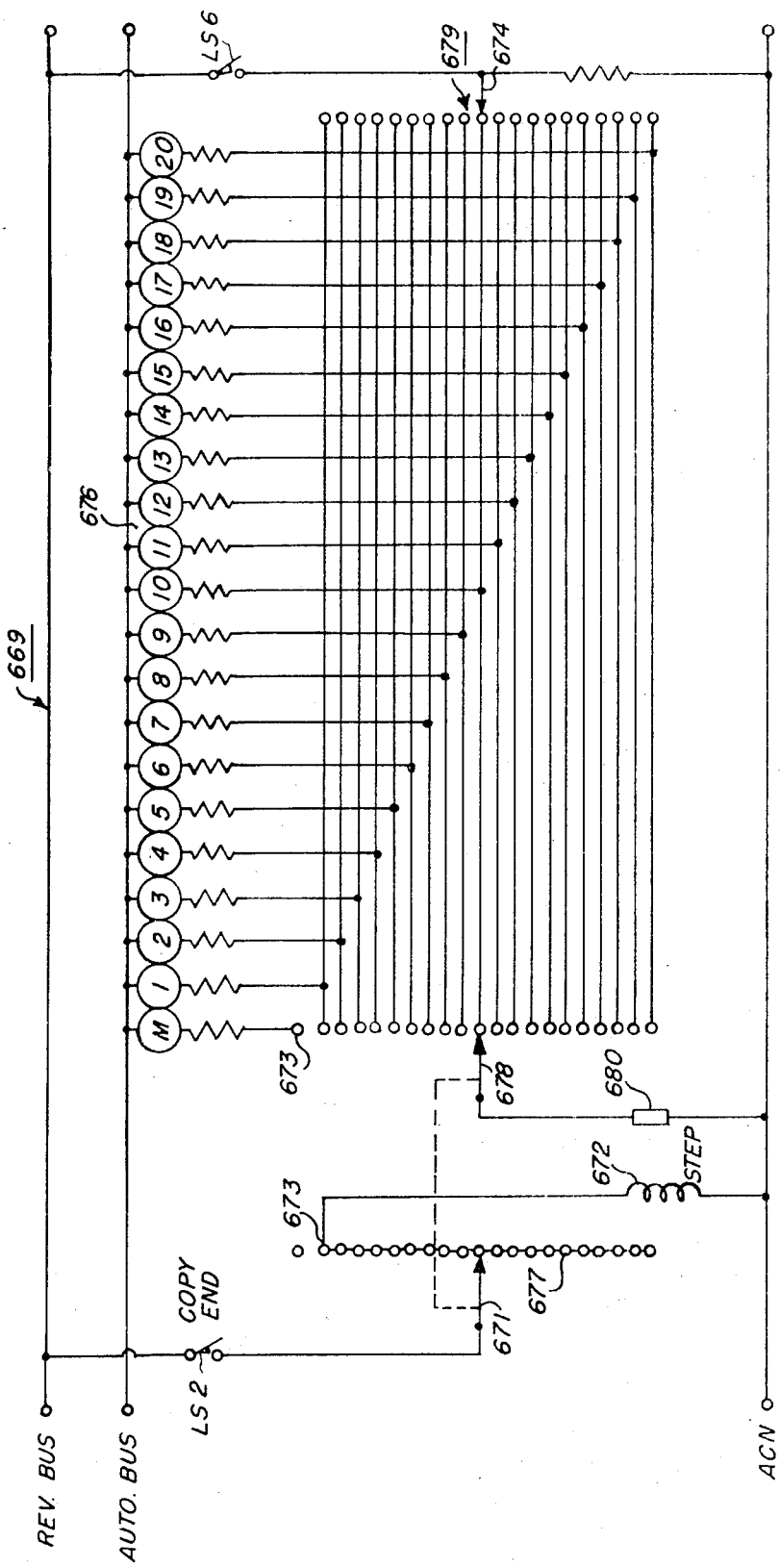

In addition, the "autobus" voltage energizes the time delay relay 641 (FIG. 18). After approximately 15 seconds, contacts 641a of this relay apply an activating voltage to the power supply circuit 642 (FIG. 22) used to power the main drive motor 342 (FIG. 14). The power supply circuit 642 (FIG. 22) includes the automatic control section 643, the manual control section 644 and the amplifier section 647. The amplifier section 647 is the control portion of a servoloop (that also includes the tachometer 648) for running the main drive motor 342. The polarity of the voltage applied to the input terminal 649 of the amplifier section 647 determines the direction of rotation for motor 342 and therefore the direction of travel of carriage 4. The magnitude of the voltage applied to input terminal 649 establishes the rotational speed of the motor 342 and hence the speed of carriage 4.

The direction of rotation is established for motor 342 by contacts 650a and b in the automatic section and switches 658 and 659 in the manual section. The normally closed contacts 650a apply a positive voltage output of power supply 645 to input terminal 649 to drive the carriage 4 from the park to the turn position. The normally open contacts 650b, when closed, apply a negative voltage to input terminal 649 to drive the carriage from the turn to the park position. The potentiometer 651 is adjusted to control the magnitude of the carriage speed.

The manual control section 644 is selected by rotating switch 654 (illustrated in two places but a single switch) to the manual position. This action disables the automatic section 643. An energizing voltage is applied by switch 654 to the power supply 655 which has the potentiometers 656 and 657 coupled across plus and minus output terminals. The positive output of power supply 655 is coupled to input terminal 649 by means of switch 658 to move the carriage left to right. The negative output of power supply 655 is coupled to input terminal 649 by means of switch 659 to move the carriage from right to left. Cam-operated switches LS16 and LS17 are opened when the carriage 4 is at either the turn or park positions respectively to prevent the motor from driving the carriage beyond those positions.

Figure 22:
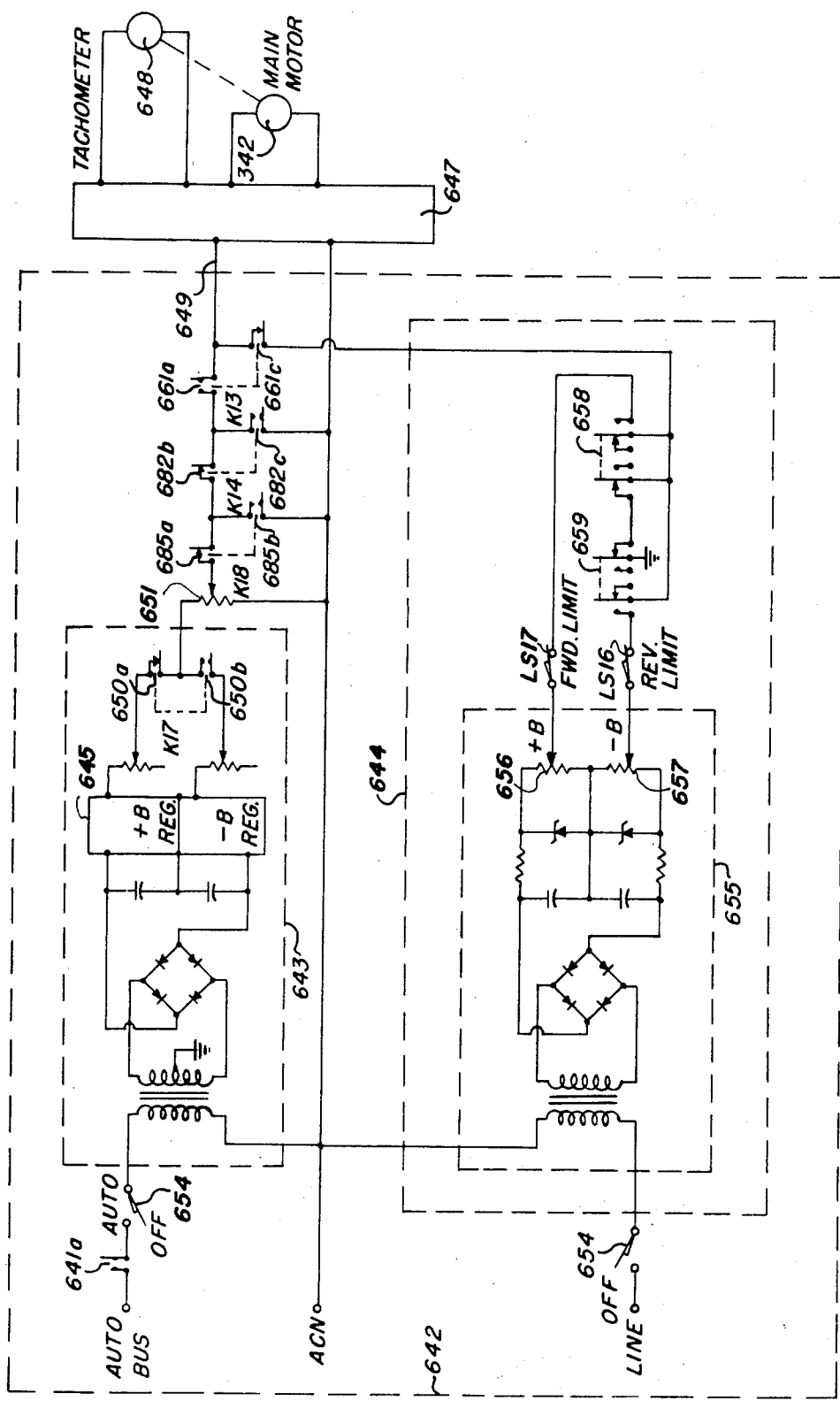

Still referring to FIG. 22, relay contacts 661a apply the activating voltage of the automatic section 643 to input terminal 649. To understand how relay 661 and therefore main motor 342 are energized it is helpful to refer to FIGS. 18 and 20. Relay 661 (FIG. 20) is energized approximately 15 seconds after an operator presses the "carriage travel" start switch 662 shown in FIG. 18. Start switch 662 couples an energizing voltage to relay 663 which in turn effects the energization of time delay relay 668. Approximately 15 seconds after time delay relay 668 is energized, the "autobus" voltage is applied through contacts 668a to relay 661 thereby activating the main motor 342 and carriage 4 (relay contacts 668b pass a "fwd bus" voltage used throughout the electrical circuit during carriage travel from park to turn positions). Relay 661 is latched to the "autobus" voltage by its own contacts 661b.

Start switch 662 (FIG. 18) couples the "autobus" voltage to relay 663 from contacts 641a, through cam-operated switch LS1 and contacts 626a, 628a and 680a. Switch LS1 is at the position shown in FIG. 18 when the carriage 4 is at the park position and is activated to energize relay 666 when the carriage moves a finite distance therefrom. Meanwhile, relay 663 is latched to the "autobus" voltage through its own contacts 663b and "carriage travel" stop switch 667. The carriage thereafter repeatedly travels through a copy-forming cycles, i.e., continuously travels between the park and turn positions, to produce the number of copies requested by the coincidence counter 669 of FIG. 21. When the desired number of copies are produced, relay 680 (FIG. 21) is energized effecting the deenergization of relay 663 by means of contacts 680a (FIG. 18).

The coincidence counter is reset by means of a reset solenoid 670 energized through contacts 663a when relay 641 is energized. Relay 664 is energized when the charge or capacitor 652 reaches a predetermined level thereby removing via contacts 664a the energizing voltage from reset soil 670.

As mentioned earlier, relay contacts 661a pass an activating voltage to the input terminal 649 of the amplifier driving motor 342. It was shown that relay 663 (FIG. 18) causes contacts 661a to close and start the carriage on its way to the turn position. Contacts 661a remain closed until the carriage returns to the park position. In the meantime, contacts 682b (FIG. 22) open to stop motor 342 when the carriage arrives at the turn position. While the carriage is resting at the turn position time delay relay 650 is energized to change the polarity of the voltage (and therefore change the direction of carriage travel) fed to motor 342. Contacts 682b close to start the carriage back to the park position and contacts 685a open to stop motor 342 when the carriage returns to the park position.

Relay 682 is energized to stop motor 342 when the cam-operated switch LS3 closes (FIG. 20) indicating the carriage is at the turn position. Relay 682 is deenergized by contacts 650c to permit the carriage to start back toward the turn position after time delay relay 650 is energized. Relay 650 has the line voltage passed by contacts 684a (the "rev bus" voltage present during turn to park travel) applied to it when relay 684 is energized. Both relays 684 and 683 are energized when the carriage arrives at the turn position. (Contacts 683b and 684a deenergize time delay relay 668 to stop production of the "fwd bus" voltage). The various relay contacts 650a, b and c do not change states until approximately 15 seconds after the "rev bus" voltage is applied to relay 650.

Meanwhile, relay 685 remains deenergized by contacts 666b because relay 666 (FIG. 18) remains energized by switch LS1 until the carriage arrives back at the park position. When contacts 666b close, relay 685 is energized thereby opening contacts 685a (FIG. 22) to stop motor 342. Contacts 685b and c and relay 665 and its contacts operate to initialize the conditions of the various relays for a subsequent machine cycle.

Turning briefly back to FIG. 18, shutdown timer 660 is energized when relay 663 is energized. Relay 663 is energized after the carriage start switch 662 is pressed and before contacts 661a (FIG. 22) close to start the carriage on its copy-forming cycle. Timer 660 actuates contacts 660a (FIG. 17) after approximately the length of time necessary to produce the maximum amount of copies permitted by the coincidence counted 669 to be serially produced. Contacts 66a effect the removal of power from lamp 54–57 and stop the carriage.

TRANSPARENCY POWER TERMINAL

The power terminal 633 (FIG. 18) is also energized at the same time as relay 663. Terminals 663 provide the energizing voltage to the light source (a tungsten bulb) used in the apparatus of FIGS. 15 and 16 to project images of transparent originals.

COINCIDENCE COUNTER

The coincidence counter 669 (FIG. 21) is a device used to select a certain number of copies (e.g., 1 through 20) to be produced by machine 1. A dial 674 is set by an operator to a setting representing the number of copies to be reproduced. The cam-operated switch LS2 is closed at the end of each machine cycle, i.e., after the production of a copy, energizing step relay 672 causing it to move its wiper arm 671 to the next contact position on the bank of positions 677. Simultaneously, wiper arm 678, mechanically coupled to wiper 671, is advanced along the contact bank 679. A light bulb is lighted in band 676 corresponding to the wiper 678 position by means of current flow through the coil of the coincidence relay 680. This current flow is insufficient to actuate this relay. However, additional current flow through relay 680 via the dial 674 and cam-operated switch LS6 is sufficient to actuate relay 680. The normally closed contacts 680a in series with the "carriage travel" start switch 662 are opened at this time to hold the automatic serial production of copies. The conditions for actuating relay 680 are for cam-operated switch LS6 to close which occurs near the end of each machine cycle and for the wiper 678 to be coupled to the same contact in bank 679 as the manually set dial 674.

CLEANING ASSEMBLY CONTROL

Figure 23:
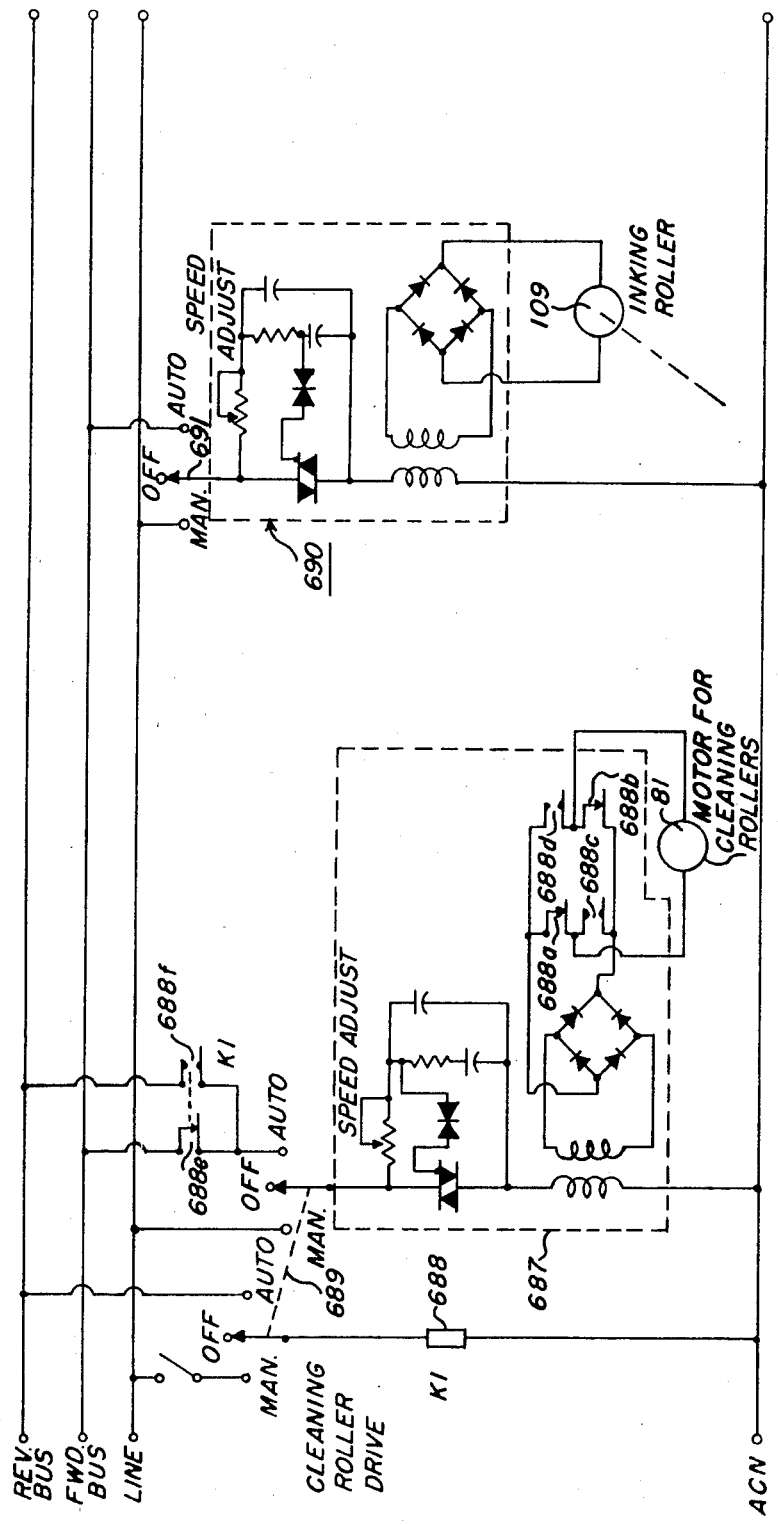
Figure 24:
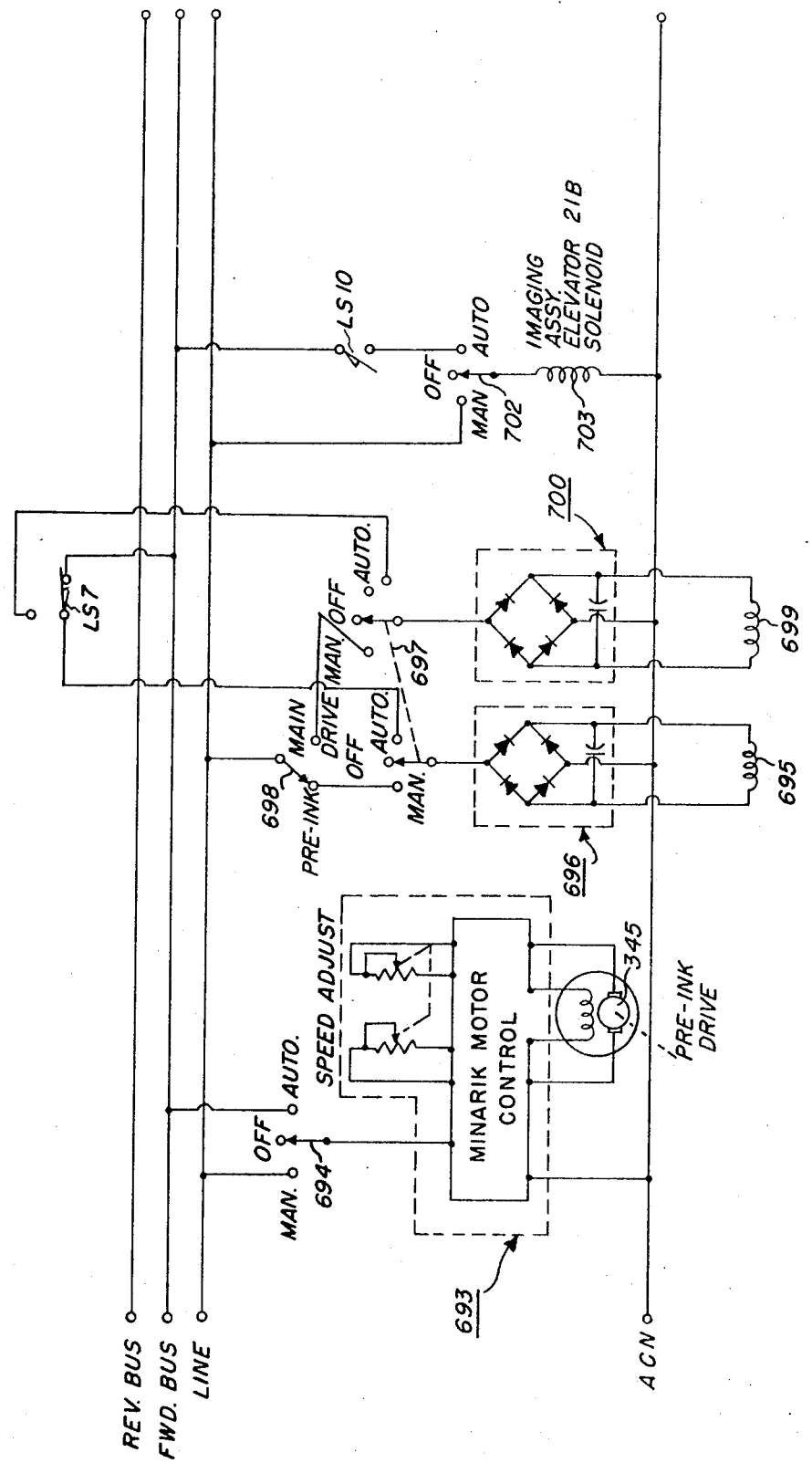

Turning now to FIG. 23, during travel of carriage 4 from the park to the turn position, the cleaning rollers 22 and 23 in the cleaning assembly 17 (FIG. 2) are rotated clockwise by motor 81. Power supply 687 (FIG. 23) applies the proper voltage polarity to motor 81 during this time through the normally closed contacts 688a and b of relay 688. The power supply 687 is enabled by the "fwd bus" voltage coupled to it through the selector switch 689 and the normally closed contacts 688c. During travel of carriage 4 from the turn to the park position, the cleaning rollers are rotated counterclockwise by motor 81. Power supply 687 applies the proper voltage polarity to motor 81 through normally open contacts 688c and d of relay 688 at this time. Relay 688 is energized by the "rev bus" voltage to close the contacts 688c and d and open contacts 688a and b. Contacts 688f apply the "rev bus" voltage to power supply 687 during this time. Selector switch 689 obviously provides a manual mode of operation for the cleaning rollers 22 and 23.

IMAGING ASSEMBLY CONTROL

The inking roller 87 in the inking assembly 19 is continuously rotated during the park to turn travel of the carriage 4. Power supply 690 (FIG. 23) applies the proper voltage polarity to motor 109 to drive roller 87 in a desired direction. Power supply 690 is enabled through the selector switch 691 by the "fwd bus" voltage. Switch 691 includes a manual operation position.

Auxiliary motor 345 (FIG. 14) runs continuously during the park to turn travel of carriage 4. Power supply 693 (FIG. 24) applies the proper voltage to motor 345 during this time. The power supply 693 is enabled by the "fwd bus" voltage through selector switch 694. Switch 694 has a manual operation position.

Once the carriage leaves the park position, the imaging roller 9 in imaging assembly 19 (FIG. 2) is rotated to coat its surface with the photoelectric ink in tank 86 from which the desired image is to be formed. The imaging roller is held at a nonoperating position at this time by elevator mechanism 21b. Roller 9 is powered at this time by auxiliary motor 345 because the solenoid 695 (FIG. 24) on the auxiliary clutch 348 is energized. Clutch 348 is energized by power supply 696 which is enabled by the "fwd bus" voltage applied thereto through the selector switch 697 and cam-operated switch LS7. Selector switches 697 and 698 provide manual control of clutches 348 and 351.

Cam-operated switch LS7 (FIG. 24) switches the "fwd bus" voltage from power supply 696 to power supply 700 at a point in the travel of carriage 4 that is reached prior to the image-forming area on shuttle electrode 13 arriving over the imaging roller 9. Also, the switch from power supply 696 to supply 700 occurs before elevator mechanism 21b is activated to raise the imaging roller 9. Power supply 700 applies an energizing voltage to the solenoid 699 on clutch 351 (FIG. 14) and thereby couples the imaging roller 9 to the power source driving the carriage, i.e., motor 342. Clutch 351 is disengaged when the carriage arrives at the turn position because the enabling "fwd bus" voltage is extinguished at that time.

The elevator mechanism 21b (FIG. 2) raises the imaging assembly into an operative position when cam-operated switch LS10 is activated and selector switch 702 is at the "auto" position. Switch LS10 is activated just prior to the image-forming area of shuttle electrode 13 coming over the imaging roller 9. Switches LS10 and 702 couple the "fwd bus" voltage to solenoid 703 on valve 234 in elevator mechanism 21b. With solenoid 703 energized, the imaging assembly 19 is raised to an operative position. The actual distance the assembly 19 moves is in the neighborhood of one-eighth inch. Switch LS10 remains closed until the shuttle electrode 13 has passed the imaging roller 9 at which time it opens to deenergize solenoid 703 and lower the imaging assembly.

DEVELOPING ASSEMBLY CONTROL

The brush rollers 124 and 125 (FIGS. 3–5) in the development assembly 20 scrub the surface of the developing roller 116 by rotating counterclockwise as the carriage travels past the assembly 20 toward the turn position. Power supply 704 (FIG. 25) applies the proper polarity voltage to the motor 139 to drive the rollers 124 and 125 through the normally closed contacts 706a and b of relay 706. The power supply 704 is enabled by the "fwd bus" voltage applied to it through the normally closed contacts 706c and selector switch 707. When carriage 4 is traveling past assembly 20 toward the park position, power supply 704 is enabled by the "rev bus" voltage applied thereto through the contacts 706d of relay 706. The "rev bus" voltage is applied to relay 706 to energize it through selector switch 707. Contacts 706e and f are closed to reverse the voltage polarity to motor 139. The brush rollers 124 and 125 are thereby rotated clockwise as the carriage passes the developing assembly 20 traveling toward the park position.

Spraying electrical insulating fluid onto developing roller 116 through manifolds 152 and 153 (FIG. 4) is controlled by solenoid-operated valves 708 and 709 (FIG. 25) coupled in series with the fluid lines supplying the manifolds. Coil 708 represents the solenoid on the valve coupled to the left manifold 152 and coil 709 represents the solenoid on the valve coupled to the right manifold 153. The fluid is sprayed through the left manifold 152 when the carriage is traveling toward the turn position and through the right manifold 153 when the carriage is traveling toward the park position. The cam-operated switch LS14 closes at the proper time as the carriage travels toward the turn position to apply the "fwd bus" voltage to solenoid 708 and thereby initiate spraying through manifold 152. The cam operated switch LS15 closes at proper time as the carriage travels toward the park position to apply the "rev bus" voltage to solenoid 709 and thereby initiate spraying through manifold 153.

The developing electrode roller 116 is rotated by the main drive motor 342 while the ink between it and the shuttle electrode is being exposed. At other times roller 116 is rotated by the auxiliary motor 346 to assist the brush rollers, squeegees and spray manifolds to clean its surface. Roller 116 is coupled to the auxiliary motor through the auxiliary clutch 349 and to the main motor through clutch 352. Only one of these clutches is ever engaged at a given time. The cam-operated switch LS5 (FIG. 26) switches the "fwd bus" voltage between the solenoid 710 on auxiliary clutch 349 and the solenoid 711 on clutch 352 to actuate one or the other as the carriage travels toward the turn position. The cam-operated switch LS21 switches the "rev bus" voltage between solenoids 710 and 711 to actuate one or the other during the travel of the carriage toward the park position.

Figure 25:
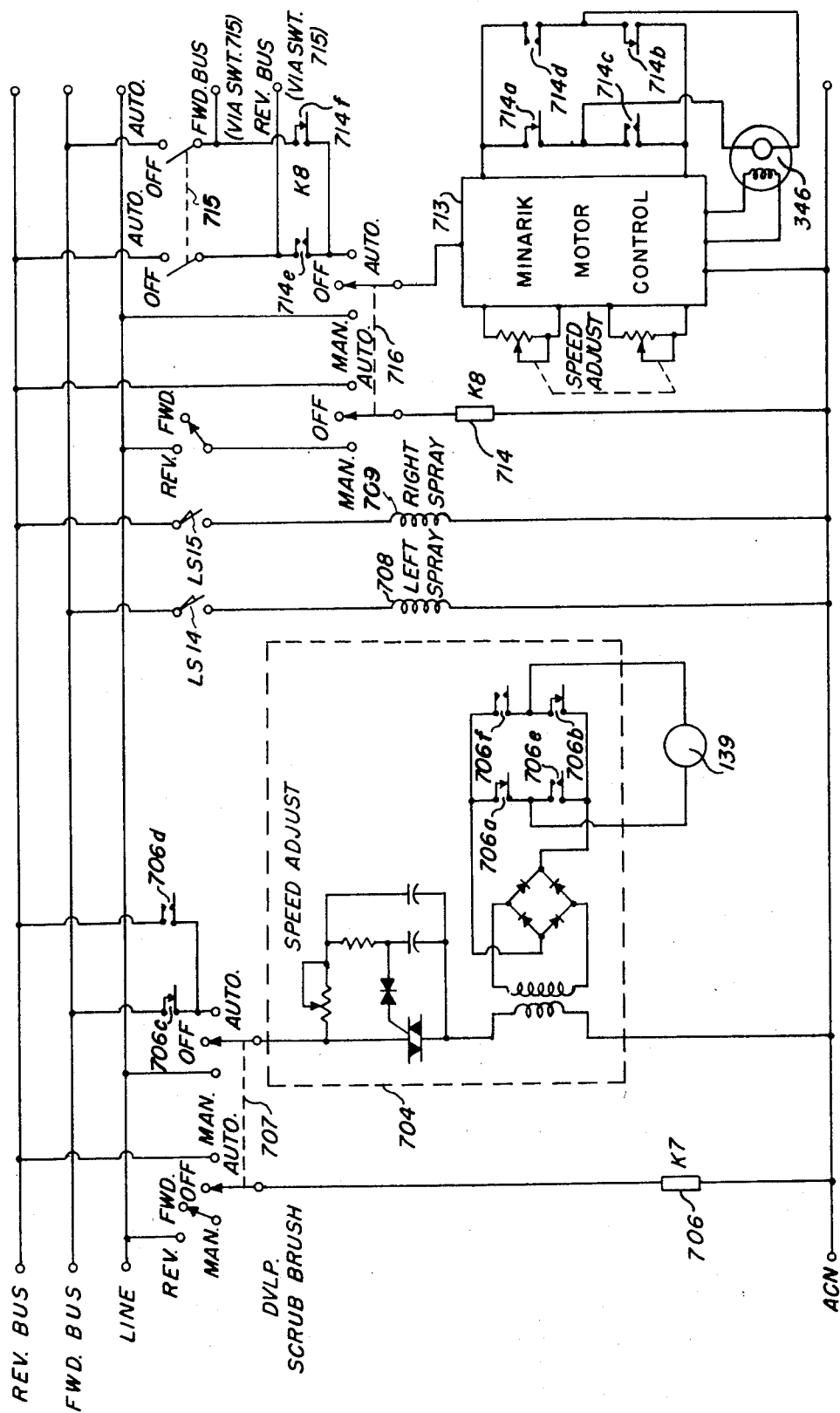

The auxiliary motor 346 runs continuously as long as the "fwd bus" and "rev bus" voltages are present. Motor 346 is energized and caused to rotate in the proper direction by a voltage applied to it by the power supply 713 (FIG. 25). The output of the power supply 713 is applied to the auxiliary motor during park to turn carriage travel through the normally closed contacts 714a and b of relay 714. The power supply 713 is enabled during the left to right travel by the "fwd bus" voltage applied to it through manual selector switches 715 and 716 and the normally closed contacts 714f. The output of power supply 713 is applied to motor 346 through contacts 714c and d during turn to park travel of carriage 4. These contacts reverse the polarity of the voltage applied to the motor causing it to rotate in the opposite direction. Power supply 713 is energized by the "rev bus" voltage applied to it through selector switches 715 and 716 and contacts 714e. Selector switch 715 couples the "rev bus" voltage to relay 714 to open normally closed contacts 714a, b and f and to close normally open contacts 714c, d and e. The manual selector switch 715 eliminates the use of the developing roller, limits its used to once during a machine cycle or permits the above-described double-use.

Figure 26:
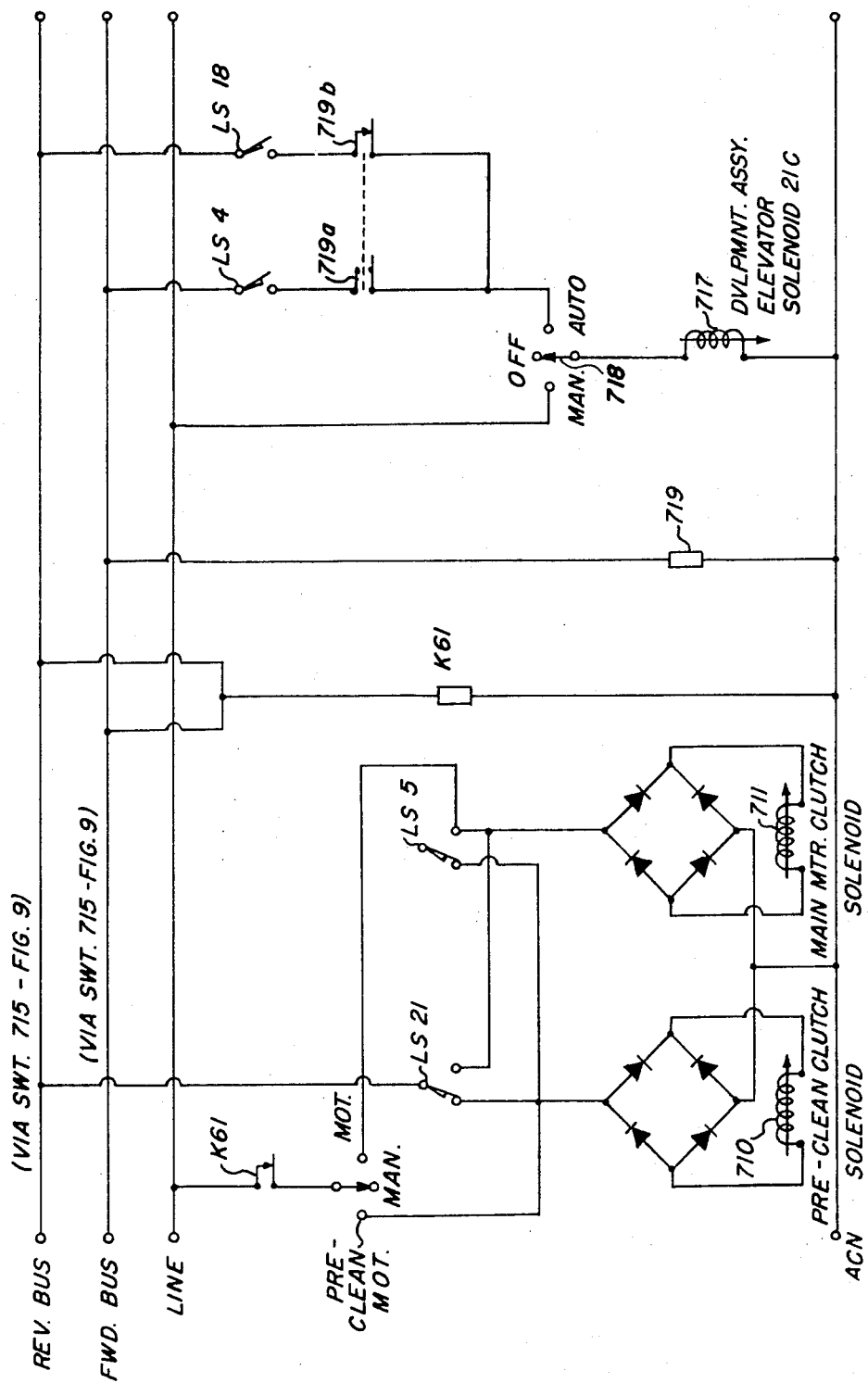
Figure 27:
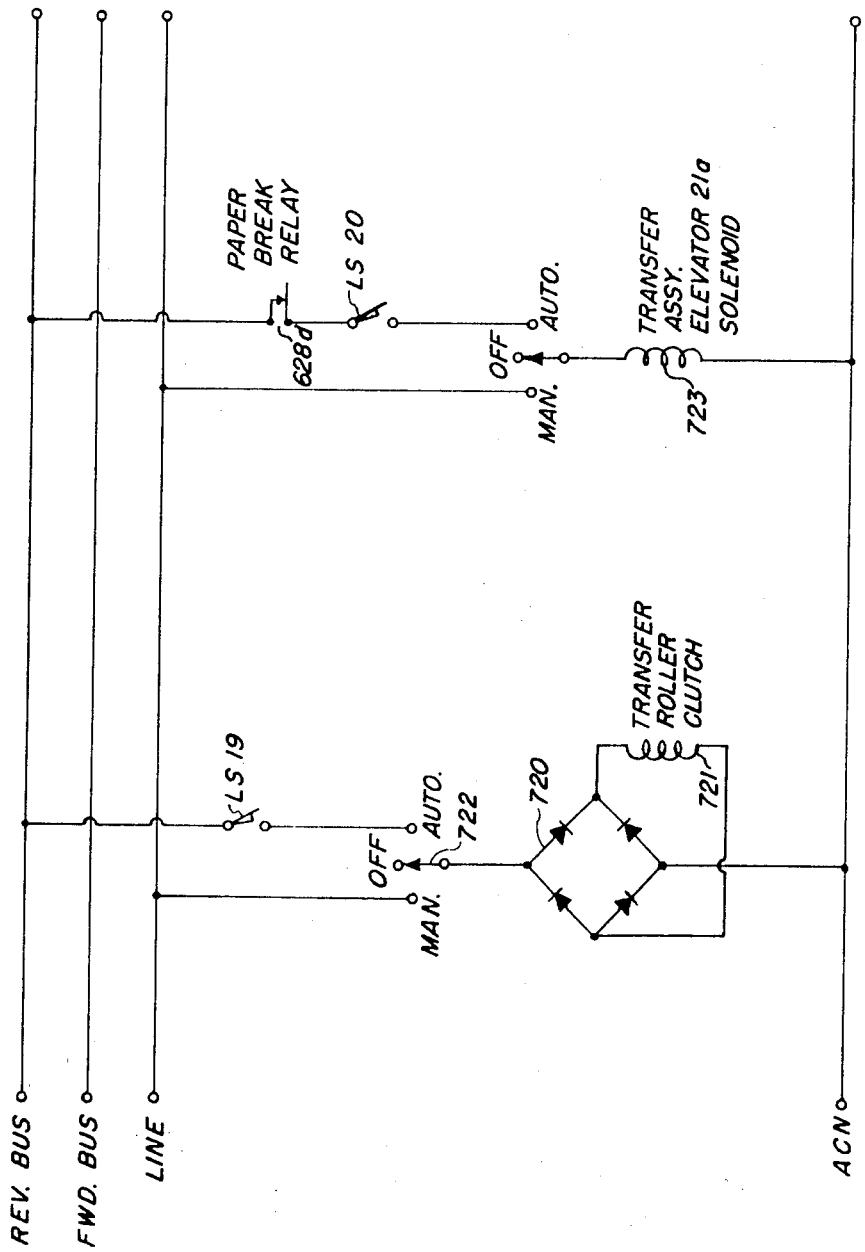
Figure 28:
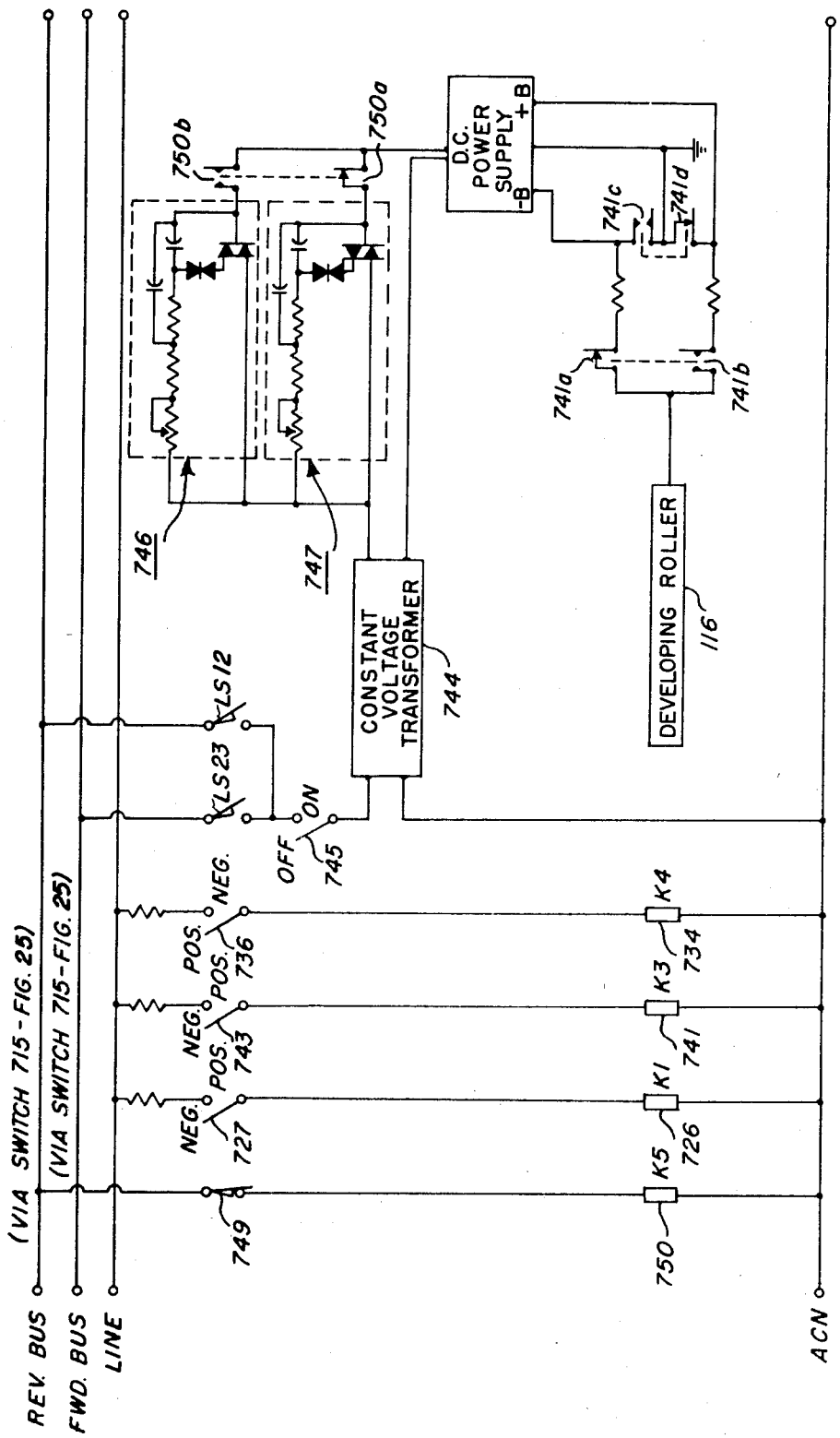
Figure 29:
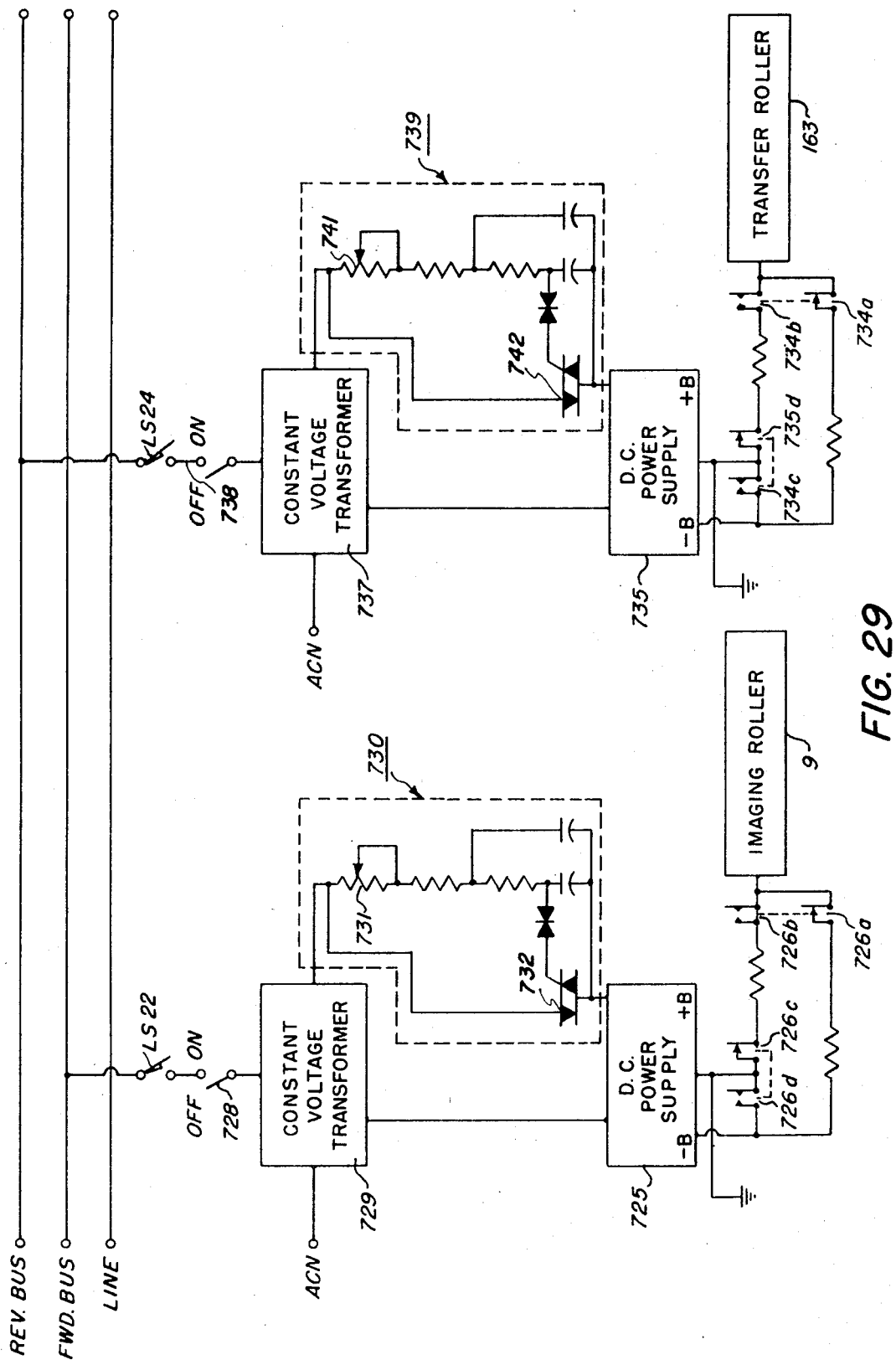

The raising and lowering of the developing roller 116 into and out of an operative position is effected by the cam-operated switches LS4 and LS18 (FIG. 26). One or the other of these switches applies an actuating voltage to the solenoid 717 on valve 234 in elevator mechanism 21c thereby raising the development assembly 20. Switch LS4 couples the "fwd bus" voltage to solenoid 717 during park to turn travel through selector switch 715 discussed earlier, a manual selector switch 718 and the contacts 719a of relay 719. Relay 719 is energized by the "fwd bus" voltage from switch 715 during park to turn carriage travel. Switch LS18 couples the "rev bus" voltage from switch 715 to solenoid 717 during turn to park travel through selector switch 718 and contacts 719b of relay 719.

TRANSFER ASSEMBLY CONTROL

The transfer roller 163 (FIGS. 2, 6, 7 and 8) is rotated to effect the transfer of the image on the shuttle electrode 13 during the turn to park travel of carriage 4. Roller 163 is rotated by the main motor 342 (FIG. 14) when coupled thereto by clutch 350. Clutch 50 is engaged when its solenoid 721 (FIG. 27) is energized. Cam-operated switch LS19 applies the "rev bus" voltage through switch 722 to rectifier 720 which in turn energizes solenoid 721.

The transfer roller 163 is raised to an operative position by elevator mechanism 21a when solenoid 723 (FIG. 27) on the elevator mechanism valve 234 is energized. Cam-operated switch LS20 applies the "rev bus" voltage to solenoid 723 through the manual selector switch 724 to raise the transfer roller 163. The "rev bus" voltage also passes through the contacts 628d of the paper break relay 628 which is energized to open contacts 628d if the web 27 (FIG. 2) breaks.

ELECTRIC FIELD CONTROL

The electric fields between the shuttle electrode 13 and the imaging 9, developing 116 and transfer rollers 163 are established by coupling appropriate voltages to these various elements. A voltage scheme successfully operated with certain photoelectrophoretic inks is to couple a ground potential to the shuttle electrode, negative DC potentials (not necessarily the same in magnitude) to the imaging and developing electrodes and a positive DC potential to the transfer roller.

The following described circuitry applies DC voltages to the imaging, developing and transfer electrodes and includes means for reversing the polarity of the voltages applied to the different rollers and for varying the magnitude of the voltages.

A voltage is applied to the imaging roller 9 from the rectifier/regular circuit 725 (FIG. 29) through either the relay contacts 726a or b. Contacts 726a couple, for example, the negative terminal of circuit 725 to the image roller whereas contacts 726b couple the positive terminal to the roller. Contacts 726c and d couple the unused terminal on circuit 725 to ground. Relay 726 (FIG. 28) has the line voltage coupled to it through the manually operated select switch 727 and is energized or not energized depending upon the polarity desired for the voltage applied to roller 9.

The instant at which the voltage is applied to the imaging electrode roller 9 is controlled by cam-operated switch LS22

(FIG. 29) Switch LS22 couples the "fwd bus" voltage through the manual on-off switch 728 to the step up transformer 729. The output of transformer 729 is coupled to the input of the rectifier/regulator 725 after passing through the gating circuit 730. The potentiometer 731 is used to adjust the trigger level of triac 732 which in turn controls the magnitude of the rms current fed to the rectifier/regular. The rms current magnitude determines the voltage level at the output of circuit 725.

A circuit similar to the foregoing is used to couple a voltage to the transfer roller 163. The relay contacts 734a (FIG. 29) couple the positive output terminal, for example, of rectifier/regulator circuit 735 to roller 163 whereas relay contacts 734b couple the negative output terminal to roller 163. Relay contacts 734c and d couple the unused output terminal to ground. Relay 734 (FIG. 29) is energized by means of the manual selector switch 736 depending upon whether a positive or negative voltage is desired on the transfer roller.

The "rev bus" voltage is coupled to step up transformer 737 (FIG. 29) through the manual selector switch 738 and cam-operated switch LS24. The output of transformer 737 is coupled to the input of circuit 735 through the gating circuit 739. Potentiameter 741 is used to adjust the trigger level of triac 742 and thereby controls the rms current input to the rectifier/regulator circuit 735. The rms input determines the magnitude of the voltage at the transfer roller.

The circuit used to couple a voltage to the developing electrode 116 is substantially the same as the foregoing circuits but includes additional features. The relay contacts 741a (FIG. 28) couple the negative terminal, for example, of rectifier/regulator circuit 742 to the developing electrode roller 116 whereas relay contacts 741b couple the positive output terminal to roller 116. Relay 741 is energized or not energized by means of manual selector switch 743 depending upon the voltage polarity desired at the developing electrode 116.

The developing electrode is normally used twice during a machine cycle, therefore cam-operated switch LS23 couples the "fwd bus" voltage (passed by switch 715 in FIG. 25) to the step-up transformer 744 during park to turn travel of carriage 4 and cam-operated switch LS12 couples the "rev bus" voltage (passed by switch 715 in FIG. 25) to transformer 744 during the turn to park travel of the carriage. Each of these voltages is applied to transformer 744 through on-off switch 745. The output of transformer 744 is routed to the rectifier/regulator circuit 742 through one or the other of the gating circuits 746 or 747. Two gating circuits are employed to provide the capability of having different voltage levels on the developing electrode during the two different passes of the shuttle electrode past the developing electrode. With the manually activated switch 749 (FIG. 28) closed, relay 750 is energized during the turn to park travel of the carriage 4 by the "rev bus" voltage (passing switch 715). Consequently, gating circuit 747 is coupled by relay contacts 750a between transformer 744 and rectifier/regulator 742 during the park to turn travel of the carriage and gating circuit 746 is coupled by relay contacts 750b to the same components during turn to park travel of carriage 4. With the manually activated switch 749 open, the gating circuit 747 couples the transformer to the rectifier/regulator for both directions of carriage travel by means of contacts 750a.

LAMP CONTROL

Figure 30:
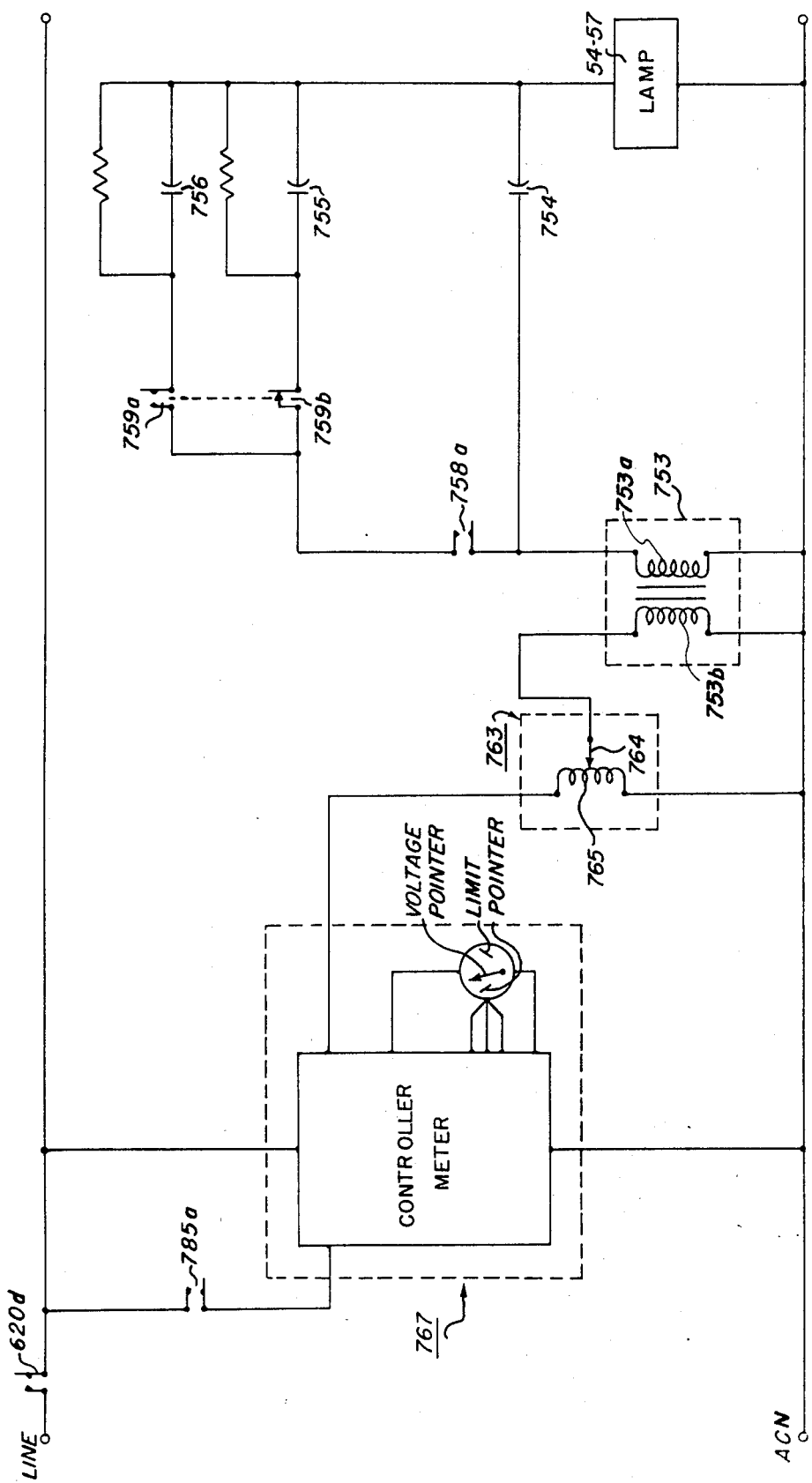

Each of the lamps 54–57 is powered by its own circuit which are substantially the same thereby warranting a detailed description of only one. The lamps are metallic additive gas discharge lamps and are ignited and sustained by a lead peaked ballast circuit 752 (FIG. 30). The ballast circuit includes the step-up transformer 753 (or an autotransformer) and the capacitors 754, 755 and 756. The capacitors are coupled in parallel with one another by the relay contacts 758a, 759a and 759b and are coupled in series with the secondary winding 753d of transformer 753.

The operating current or power supplied to a lamp is controlled by switching capacitors 755 and 756 into and out of the ballast circuit and by varying the current supplied to the primary winding 753b of transformer 753. The capacitors are switched into and out of the circuit by means of the cam-operated switch LS25 (FIG. 31) and are used to raise the lamp current to a desired operation level. Prior to closing switch LS25 (LS26–28 for the other three circuits), the lamp current resulting from having only capacitor 754 coupled to the lamp is at a level sufficient to sustain lamp ignition but not at a level sufficient to produce the luminary output desired for imaging. Running at the lower power level in this manner prolongs the life of the lamp. Switch LS25 (through selector switch 761) energizes the mercury switch 758 closing contacts 758a. (A mercury switch is used in order to handle the high currents involved.) Relay 759 is energized by means of a manual selector switch 760. The contacts 759a and b (FIG. 30) of relay 759 determine which capacitor 755 or 756 is to be connected into the circuit. Each capacitor results in a proper operating current level for the lamp when in the ballast circuit but two distinctly different current levels. The two level current capability allows for wide variations in operating characteristics of different lamps.

The current in the primary of transformer 753 (FIG. 30) is varied by the motor driven variable inductor 763. The variable inductor includes a wiper arm 764 which is continuously adjustable over a given voltage or current range. Moving the wiper arm physically changes the number of windings or turns on coil 765 thereby varying the current or voltage level available to transformer 753. The controller meter 767, model number 3344, manufactured by the Simpson Instrument Co, is coupled across the primary of transformer 753 and is used to automatically maintain the current flow through the primary within predetermined levels. Consequently, the lamp current and luminary output is maintained within predetermined limits.

The controller meter is a voltmeter having a voltage pointer that moves along a scale indicating the magnitude of a voltage (or current). In addition, there are two limit pointers which are manually positioned at location on the scale. The limit pointers and the voltage pointer together form a switch. When the voltage pointer and a limit pointer register the same reading on the meter scale, the contacts of a switch are activated, specifically contacts 770 and 771 in FIG. 31.

Figure 31:
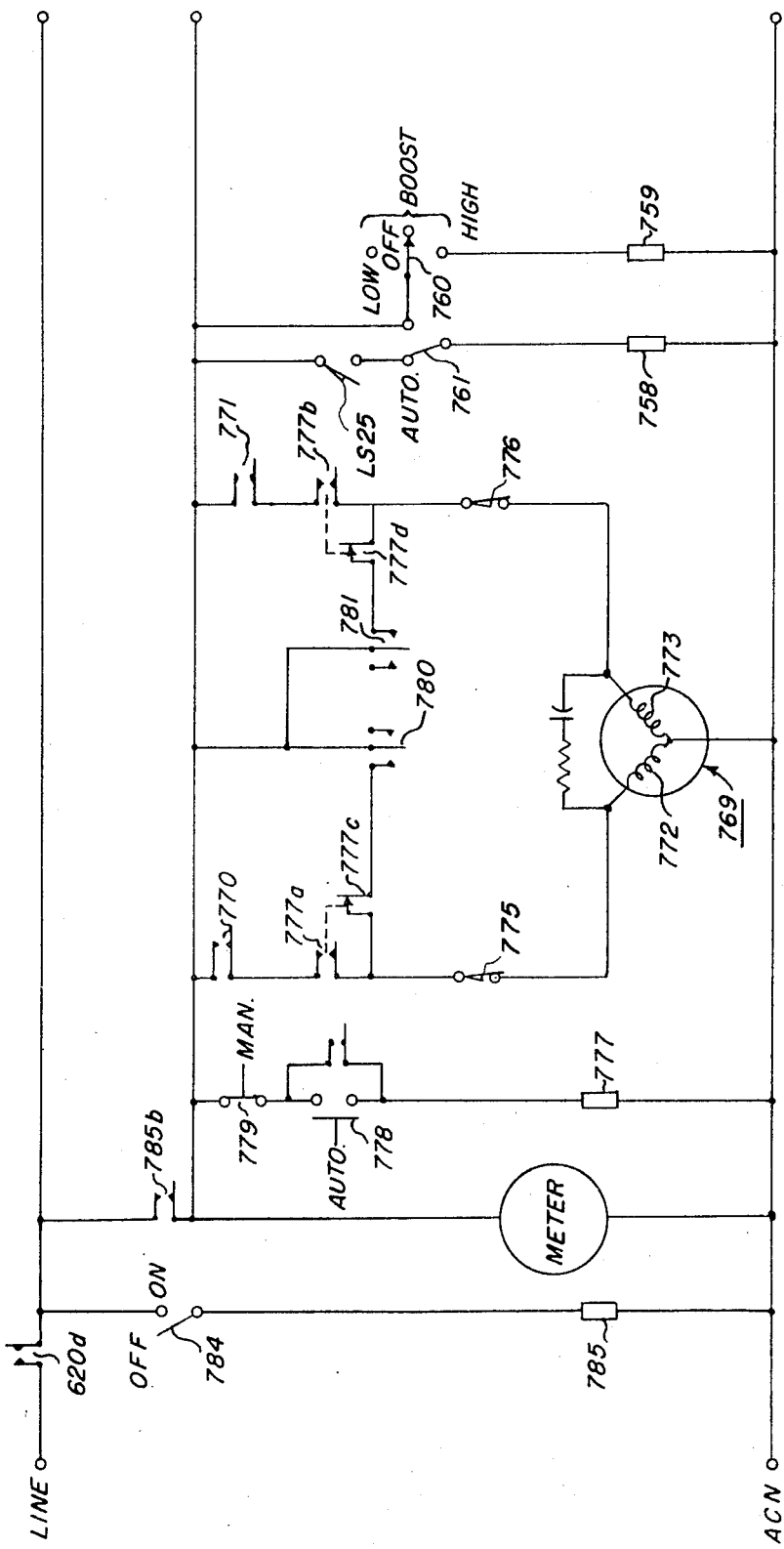

The controller meter 767 is used in a control loop to maintain the voltage or current input to transformer 753 constant. The limit pointers are positioned at meter settings on either side of a desired voltage (or current) operation level. When the actual voltage (or current) falls below or rises above the desired level, one or the other of the limit pointers are encountered by the voltage pointer thereby activating either switch 770 or 771 (FIG. 31). The switch couples an appropriate voltage to motor 769 thereby driving the wiper arm 764 in a direction that moves the pointer back between the limit pointers, i.e., raises or lowers the input voltage (or current) an amount to bring it back within the desired limits.

Switch 770 (FIG. 31) couples the line voltage to winding 772 on the double-wound AC motor 769. Energizing winding 772 causes the motor to rotate in a direction that moves the wiper arm 764 in a direction to increase the voltage (or current) input to transformer 753. Similarly, switch 771 couples the line voltage to winding 773 causing the motor to rotate in a direction that moves the wiper arm 764 in a direction to decrease the voltage (or current) input to transformer 753. Switches 775 and 776 coupled in series with the two windings or motor 769 open when the wiper arm 764 is driven to the limits of its travel. Switch contacts 777a and b are also coupled in series with the motor windings and are closed when relay 777 is energized.

Relay 777 is energized when meter 767 is selected to control the input voltage (or current) to the ballast circuit 752. The selection is made by means of selector switch 778 which couples the line voltage to relay 777. The manual selector switch 779 is opened when the adjustment of wiper arm 764 is to be accomplished manually. Contacts 777c and d couples the manual control switches 780 and 781 across the two windings of motor 769. These switches are closed to apply the line voltage to either winding 772 or 773 and thereby manually drive the wiper arm in a direction that either increases or decreases the current input to the ballast circuit 752. Contacts 777a and b are open during this time to prevent meter 767 from controlling motor 769.

The line voltage is made available to the lamp control circuits through relay contacts 620d, e, f and g. Relay 620 (FIG. 17) is energized, as discussed earlier, after the lamp "power on" switch 622 is pressed. However on-off switch 784 (FIG. 31) must still be thrown to apply the line voltage to the lamps. Switch 784 energizes relay 785 whose contacts 785a couple the line voltage to the ballast circuit and whose contacts 785b make the line voltage available to the variable inductor motor 769.

The machine 1 is also capable of operation in an opaque mode with tungsten rather than metallic additive gas discharge lamps. In this case, the tungsten lamp is coupled in place of the primary winding of transformer 753.

What is claimed is:

1. Scanning apparatus comprising
   a carriage supported for travel along a generally linear path having a platen coupled thereto for carrying an opaque original and having a shuttle plate coupled thereto spaced from and generally parallel to the platen, and
   illumination and projection means positioned adjacent the path traveled by the carriage for illuminating an area of said platen as the carriage travels thereby and for projecting a light image from the illuminated area to the shuttle plate.

2. The apparatus of claim 1 including at least two of said illuminating and projection means all illuminating an area of the platen and projecting a light image therefrom to substantially the same area of the shuttle plate.

3. The apparatus of claim 2 wherein said illumination and projection means project light images over substantially similar optical path to effect registration on the shuttle plate of the light image projected thereto by each of said illumination and projection means.

4. The apparatus of claim 1 wherein said illumination and projection means includes means for projecting onto said shuttle plate a wrong reading light image of an original on said platen.

5. The apparatus of claim 1 wherein said illumination and projection means is positioned relative to the path traveled by the carriage to be located between said platen and shuttle plate as the carriage travels thereby.

6. The apparatus of claim 5 wherein said illumination and projection means includes means to fold the optical path therethrough to reduce the distance between said platen and shuttle plate.

7. The apparatus of claim 6 wherein said means to fold an optical path includes a mirror positioned at the nodal point of a lens to reflect light images transmitted by the lens back through the lens.

8. The apparatus of claim 1 wherein said illumination and projection means includes a lamp of a length substantially the width of said platen having a reflector for reflecting light toward said platen with said reflector having means through which a heat-exchanging fluid is directed onto said lamp.

9. The apparatus of claim 1 wherein said illumination and projection means includes
   a first mirror supported to reflect light images from the illuminated area of said platen,
   a lens supported to pass light images reflected by said first mirror,
   a nodal mirror positioned at the nodal point of said lens to reflect light images transmitted by the lens back through the lens, and
   a third lens positioned to reflect light images reflected back through said lens to said shuttle plate.

10. The apparatus of claim 1 wherein said platen includes optically transparent glass and said shuttle plate includes optically transparent glass coated with an optically transparent, electrically conductive material.

11. The apparatus of claim 1 wherein said shuttle plate is a transparent conductor and further including
    an imaging electrode positioned adjacent said path to contact the shuttle plate as the carriage travels thereby and having means for coupling to a voltage source to establish an electric field between the shuttle plate and imaging electrode, and
    inking means for applying photoelectrophoretic ink between said shuttle plate and imaging electrode to form an image from the ink exposed to a light image projected to the shuttle plate by said illumination and projection means and subjected to an electric field established between the shuttle plate and imaging electrode.

12. The apparatus of claim 1 wherein said illumination and projection means is positioned relative to said path to fit between the platen and shuttle plate as the carriage travels thereby and said imaging electrode and inking means are positioned relative to said illumination and scanning means to allow the shuttle plate to pass between them as the carriage travels thereby.

13. The apparatus of claim 12 further including
    a developing electrode positioned adjacent said imaging electrode having means for coupling to a voltage source to subject an image formed on the shuttle electrode to an electric field as the carriage travels past the developing electrode, and
    second illumination and projection means for illuminating areas of an original on the platen and for projecting in registration a light image onto the image formed on the shuttle electrode as the carriage travels past the developing electrode.

14. Scanning apparatus comprising
    a carriage supported for travel along a generally linear path having a platen for carrying an opaque original and a shuttle plate spaced from and generally parallel to said platen,
    first illumination means positioned adjacent said path to fit between said platen and shuttle plate as the carriage travels thereby for illuminating an area of an original on the platen,
    first projection means positioned adjacent said path to fit between the platen and shuttle plate as the carriage travels thereby for projecting light images from areas illuminated by said first illumination means to said shuttle plate,
    second illumination means positioned adjacent said path to fit between the platen and target plate as the carriage travels thereby for illuminating an area of an original on the platen, and
    second projection means positioned adjacent said path to fit between said platen and shuttle plate as the carriage travels thereby for projecting light images from the areas illuminated by said second illumination means to substantially the same locations on the shuttle plate to which the same images are projected by said first projection means.

* * * * *